United States Patent
Suzuki et al.

(10) Patent No.: US 10,509,793 B2
(45) Date of Patent: Dec. 17, 2019

(54) INFORMATION PROVISION APPARATUS THAT PROVIDES INFORMATION RELATED TO ITEM USED BY USER, AND MANAGEMENT CLIENT

(71) Applicant: JVC KENWOOD Corporation, Yokohama-shi, Kanagawa (JP)

(72) Inventors: Kenta Suzuki, Yokohama (JP); Ichiro Shishido, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 262 days.

(21) Appl. No.: 15/366,774

(22) Filed: Dec. 1, 2016

(65) Prior Publication Data
US 2017/0161342 A1 Jun. 8, 2017

(30) Foreign Application Priority Data
Dec. 4, 2015 (JP) ................ 2015-237885

(51) Int. Cl.
| | | |
|---|---|---|
| G06F 16/248 | (2019.01) | |
| G06F 16/28 | (2019.01) | |
| G06N 5/04 | (2006.01) | |
| G06Q 30/02 | (2012.01) | |

(52) U.S. Cl.
CPC .......... *G06F 16/248* (2019.01); *G06F 16/285* (2019.01); *G06N 5/048* (2013.01); *G06Q 30/02* (2013.01)

(58) Field of Classification Search
CPC ........ G06F 17/30554; G06F 17/30598; G06N 5/048
See application file for complete search history.

(56) References Cited

U.S. PATENT DOCUMENTS

| | | | |
|---|---|---|---|
| 2012/0246244 A1* | 9/2012 | Mallet ................ | G06Q 50/01 709/206 |
| 2013/0044137 A1* | 2/2013 | Forsblom ............. | G09B 29/106 345/661 |
| 2015/0227987 A1* | 8/2015 | Kumar ............... | G06Q 30/0282 705/319 |

(Continued)

FOREIGN PATENT DOCUMENTS

| | | | |
|---|---|---|---|
| JP | 2003-109069 A | * 4/2003 | ............... H04Q 7/20 |
| JP | 2004-320217 A | 11/2004 | |

(Continued)

*Primary Examiner* — Mark E Hershley
*Assistant Examiner* — Aryan D Toughiry
(74) *Attorney, Agent, or Firm* — Brundidge & Stanger, P.C.

(57) ABSTRACT

A group former derives location information of a subject being a user or a terminal device, and forms a group including a plurality of subjects, based on time-series data of location information related to a plurality of subjects. A point calculator calculates a feature action amount indicating a matching degree to a predetermined action pattern, based on which power of influence of a subject in a group is determined to be high, based on time-series data of the location information, for each of the plurality of subjects included in the group, and calculates a point of each subject based on the feature action amount. An aggregation processor calculates an item point corresponding to each item, by aggregating points. A transceiver outputs an item point.

15 Claims, 38 Drawing Sheets

(56) References Cited

U.S. PATENT DOCUMENTS

2015/0248683 A1* 9/2015 Walkingshaw ..... G06F 17/3089
 705/7.33
2016/0295171 A1* 10/2016 Van Den Brink ..... H04N 7/181
2017/0091861 A1* 3/2017 Bianchi ................ G06Q 40/025
2017/0303079 A1* 10/2017 Ikemoto ................ G06Q 30/02

FOREIGN PATENT DOCUMENTS

| JP | 2010-231390 A |   | 10/2010 |            |
|----|---------------|---|---------|------------|
| JP | 2013-60240 A  | * | 3/2013  | G08B 13/181 |
| JP | 2015035082 A  |   | 2/2015  |            |

* cited by examiner

FIG. 3

| TIME AND DATE | TERMINAL ID | LATITUDE | LONGITUDE |
|---|---|---|---|
| 2015/3/20 10:11:25 | A | 48.51012 | 2.22023 |
| 2015/3/20 10:11:55 | A | 48.51018 | 2.22025 |
| 2015/3/20 10:11:26 | B | 48.51011 | 2.22024 |
| 2015/3/20 10:11:55 | B | 48.51012 | 2.22025 |
| 2015/3/20 10:11:20 | C | 48.51015 | 2.22023 |
| ... | ... | ... | ... |
| 2015/3/20 10:11:53 | C | 48.51018 | 2.22025 |
| ⋮ | | | |

| SHOP ID | GENRE | LATI-TUDE | LONGI-TUDE | Lp LARGE | Lp MEDIUM | Lp SMALL | THE NUMBER OF CUSTOMERS | PRICE RANGE OF COMMERCIAL PRODUCTS (YEN) |
|---|---|---|---|---|---|---|---|---|
| S1 | JAPANESE FOOD | 48.45 | 2.335 | 130 | 80 | 40 | 250 | 1000~2500 |
| S2 | WESTERN FOOD | 48.45 | 2.283 | 30 | 40 | 150 | 220 | 300~1000 |
| S3 | ITALIAN FOOD | 48.45 | 2.313 | 75 | 50 | 55 | 180 | 1000~2500 |
| S4 | BAR | 48.21 | 2.335 | 105 | 155 | 40 | 300 | 1000~2500 |
| S5 | FRENCH FOOD | 48.21 | 2.283 | 140 | 50 | 30 | 220 | 2500~10000 |
| S6 | CHINESE FOOD | 48.21 | 2.313 | 70 | 80 | 110 | 260 | 300~1000 |
| S7 | CHINESE FOOD, JAPANESE FOOD | 48.76 | 2.335 | 130 | 250 | 120 | 500 | 300~1000 |
| S8 | FAST FOOD | 48.76 | 2.283 | 40 | 100 | 280 | 420 | 300~1000 |
| S9 | WESTERN FOOD | 49.15 | 2.855 | 50 | 120 | 180 | 350 | 100~2500 |
| S10 | ETHNIC FOOD | 49.25 | 2.806 | 200 | 100 | 115 | 415 | 2500~10000 |
| ... | | | | | | | | |

|   | A  | B  | C  | D  | E  | F  | G  | H |
|---|----|----|----|----|----|----|----|---|
| A |    |    |    |    |    |    |    |   |
| B | 1  |    |    |    |    |    |    |   |
| C | 3  | 2  |    |    |    |    |    |   |
| D | 5  | 4  | 7  |    |    |    |    |   |
| E | 6  | 8  | 7  | 2  |    |    |    |   |
| F | 20 | 25 | 30 | 28 | 22 |    |    |   |
| G | 21 | 27 | 28 | 30 | 23 | 2  |    |   |
| H | 50 | 52 | 54 | 55 | 57 | 47 | 48 |   |

| GROUP ID | TERMINAL ID | LEADER POINT (Lp) |
|---|---|---|
| G1 | A | 20 |
| G1 | B | 50 |
| G1 | C | 30 |
| G2 | A | 0 |
| G2 | C | 0 |
| G2 | F | 0 |
| G2 | G | 0 |
| ... | ... | ... |

| GROUP ID | TERMINAL ID | CALCULATION TIME AND DATE | LEADER POINT | SHOP ID |
|---|---|---|---|---|
| G1 | A | 2015/01/01 09:00 | 0.2 | S1 |
| G1 | B | 2015/01/01 09:00 | 0.5 | S1 |
| G1 | C | 2015/01/01 09:00 | 0.3 | S1 |
| G4 | A | 2015/01/01 10:05 | 0.1 | S3 |
| G4 | B | 2015/01/01 10:05 | 0.3 | S3 |
| G4 | C | 2015/01/01 10:05 | 0.5 | S3 |
| G4 | D | 2015/01/01 10:05 | 0.05 | S3 |
| G4 | E | 2015/01/01 10:05 | 0.05 | S3 |
| G5 | A | 2015/01/02 20:10 | 0.2 | S7 |
| G5 | C | 2015/01/02 20:10 | 0.6 | S7 |
| G5 | F | 2015/01/02 20:10 | 0.1 | S7 |
| G5 | H | 2015/01/02 20:10 | 0.1 | S7 |
| G6 | A | 2015/01/03 11:30 | 0.9 | S5 |
| G6 | C | 2015/01/03 11:30 | 0.1 | S5 |
| G7 | A | 2015/01/03 22:45 | 0.1 | S1 |
| G7 | Z | 2015/01/03 22:45 | 0.9 | S1 |
| ... | ... | ... | ... | ... |
|   |   |   |   |   |

| THE NUMBER OF PEOPLE IN GROUP | Lp LARGE | Lp MEDIUM | Lp SMALL |
|---|---|---|---|
| 2 | 0.8 ~ | 0.4~0.8 | ~ 0.4 |
| 3 | 0.7 ~ | 0.3~0.7 | ~ 0.3 |
| ... | ... | ... | ... |
| 10 OR MORE | 0.2 ~ | 0.05~0.2 | ~ 0.05 |

| SHOP NAME | Lp LARGE | Lp MEDIUM | Lp SMALL | TOTAL |
|---|---|---|---|---|
| SHOP S11 | 8 | 7 | 3 | 18 |
| SHOP S12 | 3 | 4 | 11 | 18 |
| SHOP S13 | 2 | 7 | 5 | 14 |
| SHOP S14 | 4 | 3 | 2 | 9 |

| S3 | S6 | S8 |
|---|---|---|
| Lp LARGE: 75 | Lp LARGE: 70 | Lp LARGE: 40, |
| Lp MEDIUM: 150 | Lp MEDIUM: 80 | Lp MEDIUM: 100, |
| Lp SMALL: 80 | Lp SMALL: 110 | Lp SMALL: 280 |

| S2 | S5 | |
|---|---|---|
| Lp LARGE: 30 | Lp LARGE: 140 | |
| Lp MEDIUM: 40 | Lp MEDIUM: 120 | |
| Lp SMALL: 150 | Lp SMALL: 100 | |

| S1 | S4 | S7 |
|---|---|---|
| Lp LARGE: 130 | Lp LARGE: 105 | Lp LARGE: 90, |
| Lp MEDIUM: 100 | Lp MEDIUM: 150 | Lp MEDIUM: 250, |
| Lp SMALL: 80 | Lp SMALL: 60 | Lp SMALL: 220 |

| GENRE | Lp LARGE | Lp MEDIUM | Lp SMALL |
|---|---|---|---|
| JAPANESE FOOD | 100 | 110 | 40 |
| WESTERN FOOD | 80 | 270 | 220 |
| ITALIAN FOOD | 55 | 90 | 35 |
| BAR | 105 | 155 | 40 |
| FRENCH FOOD | 100 | 90 | 30 |
| CHINESE FOOD | 170 | 350 | 240 |
| FAST FOOD | 40 | 180 | 200 |
| ETHNIC FOOD | 170 | 140 | 105 |
| ... | | | |

| PRICE RANGE OF COMMERCIAL PRODUCTS (YEN) | Lp LARGE | Lp MEDIUM | Lp SMALL |
|---|---|---|---|
| 300~1000 | 240 | 530 | 540 |
| 1000~2500 | 360 | 725 | 235 |
| 2500~10000 | 270 | 230 | 135 |

FIG. 21

| TERMI-NAL ID | DATE OF BIRTH | GENDER | PLACE OF WORK | TITLE | ANNUAL INCOME (10,000 YEN) | POCKET MONEY OF THIS MONTH (10,000 YEN) |
|---|---|---|---|---|---|---|
| A | 1975/7/6 | MALE | COMPANY X | HEAD | 500 | 3 |
| B | 1979/5/3 | MALE | COMPANY X | REGULAR EMPLOYEE | 400 | 4 |
| C | 1985/4/12 | FEMALE | COMPANY X | REGULAR EMPLOYEE | 400 | 5 |
| D | 1970/5/30 | MALE | COMPANY X | REGULAR EMPLOYEE | 600 | 1 |
| E | 1967/3/2 | FEMALE | COMPANY Y | COMPANY PRESIDENT | 1000 | 20 |
| F | 1964/10/1 | MALE | COMPANY Y | SECTIONAL CHIEF | 500 | 5 |
| G | 1965/5/20 | FEMALE | COMPANY Z | GENERAL MANAGER | 1500 | 10 |
| H | 1992/3/15 | MALE | COMPANY Z | SECTIONAL CHIEF | 700 | 7 |

| COMPANY NAME | ORDER DESTINATION 1 | ORDER DESTINATION 2 | ORDER DESTINATION ... |
|---|---|---|---|
| COMPANY X | COMPANY Y | ... | ... |
| COMPANY Y | COMPANY Z | ... | ... |
| ... | ... | ... | ... |

| USER ATTRIBUTE | Lp LARGE | Lp MEDIUM | Lp SMALL |
|---|---|---|---|
| 10'S MALE | 2 | 5 | 2 |
| 10'S FEMALE | 10 | 5 | 6 |
| 20'S MALE | 4 | 2 | 1 |
| 20'S FEMALE | 3 | 4 | 6 |
| 30'S MALE | 12 | 8 | 5 |
| 30'S FEMALE | 2 | 3 | 15 |

| RESIDENT AREA | Lp LARGE | Lp MEDIUM | Lp SMALL |
|---|---|---|---|
| HOKKAIDO | 1 | 2 | 2 |
| TOHOKU | 4 | 7 | 2 |
| KANTO | 24 | 32 | 40 |
| CHUBU | 0 | 1 | 2 |
| KINKI | 3 | 5 | 3 |
| CHUGOKU | 1 | 1 | 2 |
| SHIKOKU | 8 | 2 | 1 |
| KYUSHU | 3 | 7 | 12 |

| TERMINAL ID | DATE OF BIRTH | GENDER | RELATION | RELATION-SHIP |
|---|---|---|---|---|
| A | 1972/8/23 | MALE | FAMILY E | FATHER |
| B | 1973/3/15 | FEMALE | FAMILY E | MOTHER |
| C | 1995/12/2 | FEMALE | FAMILY E | DAUGHTER |
| D | 1997/3/2 | MALE | FAMILY E | SON |

| TERMINAL ID | Lp AVERAGE VALUE | Lp STANDARD DEVIATION | CATEGORY-BASED FREQUENCY | | | CATEGORY-BASED RELATIVE FREQUENCY | | |
|---|---|---|---|---|---|---|---|---|
| | | | Lp LARGE | Lp MEDIUM | Lp SMALL | Lp LARGE | Lp MEDIUM | Lp SMALL |
| A | 0.2 | 0.1 | 8 | 12 | 20 | 0.2 | 0.3 | 0.5 |
| B | 0.5 | 0.2 | 12 | 8 | 5 | 0.48 | 0.32 | 0.2 |
| ... | ... | ... | ... | ... | ... | ... | ... | ... |

| TERMINAL ID | Lp AVERAGE VALUE | Lp STANDARD DEVIATION | JAPANESE FOOD ||||||| WESTERN FOOD |||||||
| | | | CATEGORY-BASED FREQUENCY ||| CATEGORY-BASED RELATIVE FREQUENCY ||| Lp AVERAGE VALUE | Lp STANDARD DEVIATION | CATEGORY-BASED FREQUENCY ||| CATEGORY-BASED RELATIVE FREQUENCY |||
| | | | Lp LARGE | Lp MEDIUM | Lp SMALL | Lp LARGE | Lp MEDIUM | Lp SMALL | | | Lp LARGE | Lp MEDIUM | Lp SMALL | Lp LARGE | Lp MEDIUM | Lp SMALL |
|---|---|---|---|---|---|---|---|---|---|---|---|---|---|---|---|---|
| A | 0.15 | 0.05 | 2 | 6 | 12 | 0.10 | 0.30 | 0.60 | 0.25 | 0.1 | 3 | 4 | 7 | 0.21 | 0.29 | 0.50 |
| B | 0.6 | 0.2 | 8 | 5 | 3 | 0.50 | 0.31 | 0.19 | 0.35 | 0.15 | 1 | 3 | 2 | 0.17 | 0.50 | 0.33 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

| SHOP ID | TERMINAL ID | COMMERCIAL PRODUCT ID | QUANTITY | PURCHASE TIME AND DATE |
|---|---|---|---|---|
| S1 | A | I1 | 1 | 2015/02/01 09:00 |
| S1 | A | I3 | 2 | 2015/02/01 09:00 |
| S1 | B | I5 | 1 | 2015/02/01 09:02 |
| S1 | C | I1 | 5 | 2015/02/01 10:05 |
| S1 | C | I6 | 3 | 2015/02/01 10:05 |
| S1 | C | I1 | 1 | 2015/02/01 12:00 |
| S1 | D | I2 | 1 | 2015/02/01 12:10 |
| S1 | A | I1 | 5 | 2015/02/01 17:50 |
| S1 | A | I2 | 1 | 2015/02/01 17:50 |
| ... | ... | ... | ... | ... |
| S2 | A | I7 | 1 | 2015/02/01 10:00 |
| S2 | A | I8 | 3 | 2015/02/01 10:00 |
| S2 | A | I8 | 1 | 2015/02/01 10:02 |
| S2 | B | I1 | 1 | 2015/02/01 11:30 |
| S2 | B | I2 | 1 | 2015/02/01 11:30 |
| S2 | C | I8 | 1 | 2015/02/01 11:40 |
| S2 | G | I9 | 10 | 2015/02/01 13:45 |
| ... | ... | ... | ... | ... |
| S3 | A | I5 | 1 | 2015/02/02 09:00 |
| S3 | B | I3 | 1 | 2015/02/02 09:30 |
| ... | ... | ... | ... | ... |

| SHOP | Lp AVERAGE VALUE | Lp STANDARD DEVIATION |
|---|---|---|
| S21 | 0.5 | 0.15 |
| S22 | 0.15 | 0.1 |
| S23 | 0.3 | 0.3 |
| S24 | 0.3 | 0.1 |

| COMMERCIAL PRODUCT | Lp LARGE | Lp MEDIUM | Lp SMALL |
|---|---|---|---|
| I1 | 0.5 | 0.3 | 0.2 |
| I2 | 0.15 | 0.35 | 0.5 |
| I3 | 0.33 | 0.33 | 0.33 |
| I4 | 0.2 | 0.3 | 0.5 |

| SHOP | SHOP GENRE | JAPANESE FOOD Lp AVERAGE VALUE | WESTERN FOOD Lp AVERAGE VALUE | CHINESE FOOD Lp AVERAGE VALUE |
|---|---|---|---|---|
| S21 | JAPANESE FOOD | 0.6 | 0.1 | 0.1 |
| S22 | JAPANESE FOOD | 0.3 | 0.7 | 0.2 |
| S23 | WESTERN FOOD | 0.2 | 0.2 | 0.1 |
| S24 | CHINESE FOOD | 0.5 | 0.1 | 0.4 |

| GROUP ID | TERMINAL ID | LEADER POINT (Lp) |
|---|---|---|
| G1 | A | 20 |
| G1 | B | 50 |
| G1 | C | 30 |
| G2 | A | 150 |
| G2 | C | 80 |
| G2 | F | 20 |
| G2 | G | 40 |
| ... | ... | ... |
| G21 | C | 80 |
| G21 | D | 100 |
| G21 | E | 60 |

| GROUP ID | TERMINAL ID | CALCULATION TIME AND DATE | LEADER POINT | SHOP ID |
|---|---|---|---|---|
| G11 | A | 2015/01/01 10:05 | 0.1 | S1 |
| G11 | B | 2015/01/01 10:05 | 0.05 | S1 |
| G11 | C | 2015/01/01 10:05 | 0.4 | S1 |
| G11 | D | 2015/01/01 10:05 | 0.4 | S1 |
| G11 | E | 2015/01/01 10:05 | 0.05 | S1 |
| G12 | A | 2015/01/02 20:10 | 0.2 | S2 |
| G12 | C | 2015/01/02 20:10 | 0.6 | S2 |
| G12 | E | 2015/01/02 20:10 | 0.15 | S2 |
| G12 | H | 2015/01/02 20:10 | 0.05 | S2 |
| G13 | A | 2015/01/03 11:30 | 0.2 | S10 |
| G13 | C | 2015/01/03 11:30 | 0.8 | S10 |
| G14 | A | 2015/01/03 22:45 | 0.1 | S31 |
| G14 | Z | 2015/01/03 22:45 | 0.9 | S31 |
| ... | ... | ... | ... | ... |

44

INFORMATION PROVISION APPARATUS THAT PROVIDES INFORMATION RELATED TO ITEM USED BY USER, AND MANAGEMENT CLIENT

CROSS-REFERENCE TO RELATED APPLICATION

This application is based upon and claims the benefit of priority from the prior Japanese Patent Application No. 2015-237885, filed on Dec. 4, 2015, the entire contents of which are incorporated herein by reference.

BACKGROUND

1. Field

The present invention relates to an information provision technique, and particularly to an information provision apparatus that provides information related to an item used by a user, and a management client.

2. Description of the Related Art

Conventionally, there has been a technique of classifying, by user attribute, users (customers) using a shop or a commercial product, and creating marketing information by aggregating the number of sales of the commercial product for each user attribute. For example, in a shop (sushi-go-round restaurant), commercial products (sushi items) ordered by customers are recorded into a database together with customer segment information such as genders, age groups, and constituent members of the customers, and the data are aggregated, so that a customer segment-based commercial product order ranking is created (e.g., refer to JP 2010-231390 A). In addition, there is a technique of detecting location information of a plurality of mobile terminal devices, grouping mobile terminals having common location information over a predetermined time interval, and providing the group with optimum information (e.g., refer to JP 2004-320217 A).

[Patent Document 1] Japanese Patent Application Laid-open No. 2010-231390

[Patent Document 2] Japanese Patent Application Laid-open No. 2004-320217

When a user visits a shop, in some cases, the user acts independently, and in other cases, the user acts in a group such as a family, friends, or people at work. In the technique described in JP 2010-231390 A, customers can be classified using classifications such as single customer, male-and-female pair, family, male group, and female group, as constituent members. In addition, in the technique described in JP 2004-320217 A, the type of a group (married couple, parent and child, family, etc.) is estimated by combining personal information. On the other hand, in a case in which the user acts in a group and a shop or a commercial product is selected, the power of influence of each member on such decision-making is not always equal, and in many cases, it varies depending on members. Nevertheless, a difference in the power of influence of members on the selection of a shop or a commercial product has not been considered so far.

SUMMARY

For solving the above-described issues, an information provision apparatus according to an aspect of the present embodiment includes a group former that derives location information of a subject being a user or a terminal device, and forms a group including a plurality of subjects, based on time-series data of location information related to a plurality of subjects, a point calculator that calculates a feature action amount indicating a matching degree to a predetermined action pattern, based on which power of influence of a subject in a group is determined to be high, based on time-series data of the location information, for each of the plurality of subjects included in the group formed by the group former, and calculates a point of each subject based on the feature action amount, an aggregation processor that calculates an item point corresponding to each item, by aggregating points calculated by the point calculator, and an outputter that outputs an item point calculated by the aggregation processor.

Another aspect of the present embodiment is also an information provision apparatus. This apparatus includes a group former that derives location information of a subject being a user or a terminal device, and forms a group including a plurality of subjects, based on time-series data of location information related to a plurality of subjects, a point calculator that calculates a feature action amount indicating a matching degree to a predetermined action pattern, based on which power of influence of a subject in a group is determined to be high, based on time-series data of the location information, for each of the plurality of subjects included in the group formed by the group former, and calculates a point of each subject based on the feature action amount, and an outputter that outputs a point calculated by the point calculator, in association with information related to an item.

Yet another aspect of the present embodiment is an information provision method. This method includes a step of deriving location information of a subject being a user or a terminal device, and forming a group including a plurality of subjects, based on time-series data of location information related to a plurality of subjects, a step of calculating a feature action amount indicating a matching degree to a predetermined action pattern, based on which power of influence of a subject in a group is determined to be high, based on time-series data of the location information, for each of the plurality of subjects included in the formed group, and calculating a point of each subject based on the feature action amount, a step of calculating an item point corresponding to each item, by aggregating calculated points, and a step of outputting a calculated item point.

Yet another aspect of the present embodiment is also an information provision method. This method includes a step of deriving location information of a subject being a user or a terminal device, and forming a group including a plurality of subjects, based on time-series data of location information related to a plurality of subjects, a step of calculating a feature action amount indicating a matching degree to a predetermined action pattern, based on which power of influence of a subject in a group is determined to be high, based on time-series data of the location information, for each of the plurality of subjects included in the formed group, and calculating a point of each subject based on the feature action amount, and a step of outputting a calculated point in association with information related to an item.

In addition, any combination of the above-described constituent elements, and an aspect obtained by converting a wording in the present embodiment between a method, an apparatus, a system, a recording medium, a computer program, and the like are also effective as an aspect of the present embodiment.

BRIEF DESCRIPTION OF THE DRAWINGS

FIG. 3 is a diagram illustrating a data structure of a database stored in a location information manager illustrated in FIG. 2.

FIG. 4 is a diagram illustrating a data structure of a database stored in a shop information storage illustrated in FIG. 2.

FIG. 6 is a diagram illustrating a data structure of a database stored in a group former illustrated in FIG. 2.

FIG. 7 is a diagram illustrating a data structure of a database stored in a group information processor illustrated in FIG. 2.

FIG. 11 is a diagram illustrating a data structure of a point history table illustrated in FIG. 2.

FIG. 13 is a diagram illustrating a data structure of a database stored in an aggregation processor illustrated in FIG. 2.

FIG. 14 is a diagram illustrating information displayed on a management client illustrated in FIG. 1.

FIG. 16 is a layout diagram of shops in a shopping mall to be processed in the information provision system illustrated in FIG. 1.

FIG. 21 is a diagram illustrating a data structure of a database stored in a user information storage illustrated in FIG. 15.

FIG. 22 is a diagram illustrating a data structure of another database stored in the user information storage illustrated in FIG. 15.

FIG. 23 is a diagram illustrating information displayed on a management client according to the second embodiment.

FIG. 25 is a diagram illustrating yet another information displayed on the management client according to the second embodiment.

FIG. 27 is a diagram illustrating a data structure of another database stored in a user information storage according to a third embodiment.

FIG. 28 is a diagram illustrating a data structure of a user-based point aggregate table according to a fourth embodiment.

FIG. 29 is a diagram illustrating a data structure of another user-based point aggregate table according to the fourth embodiment.

FIG. 30 is a diagram illustrating a data structure of a purchase history table according to the fourth embodiment.

FIG. 31 is a diagram illustrating information displayed on a management client according to the fourth embodiment.

FIG. 33 is a diagram illustrating yet another information displayed on the management client according to the fourth embodiment.

FIG. 35 is a diagram illustrating yet another information displayed on the management client according to the fourth embodiment.

FIG. 36 is a diagram illustrating a data structure of a database stored in a group information processor according to a fifth embodiment.

FIG. 37 is a diagram illustrating a data structure of a point history table according to the fifth embodiment.

DETAILED DESCRIPTION

The invention will now be described by reference to the preferred embodiments. This does not intend to limit the scope of the present invention, but to exemplify the invention.

First Embodiment

Before specifically describing the present invention, an overview will be first described. The first embodiment relates to an information provision system including an information provision apparatus, a plurality of terminal devices connectable to the information provision apparatus, and a management client connectable to the information provision apparatus. A group is formed by users carrying the plurality of terminal devices respectively and acting together. In making decision in a group, for example, in deciding a restaurant to which the group goes to have a meal, the preference of a user having large power of influence in the group is reflected in some cases. Thus, an information provision apparatus according to the present embodiment forms a group using location information of a plurality of terminal devices and estimates the power of influence of each user in the group, and derives the power of influence of a user as a leader point.

Furthermore, the information provision apparatus constructs information obtained by aggregating leader points in association with shops, commercial products, and the like, i.e., leader points (item points) corresponding to shops, commercial products, and the like. At this time, the information provision apparatus classifies the leader points into a plurality of categories (leader point categories) based on a predetermined rule, and constructs display data indicating a frequency distribution of leader point categories for each of shops, commercial products, or the like. Based on this, the information provision apparatus classifies a plurality of users (customers) that has visited a shop such as a restaurant, into predetermined types based on action histories of the users, and calculates the number of users for each type, whereby customer analysis information is created. The created customer analysis information is provided to a shop operator, or an operator of a group of shops such as a shopping mall and a shopping street.

Next, information provided in the present embodiment will be described. The information provision apparatus provides a group with information about an item. The "item" is a term representing overall target objects used by users, and examples of the items include shops, commercial products, services, Web pages, digital content, and the like. In the present embodiment, the item refers to a shop such as a restaurant. The overview has been described above.

Figure 1:
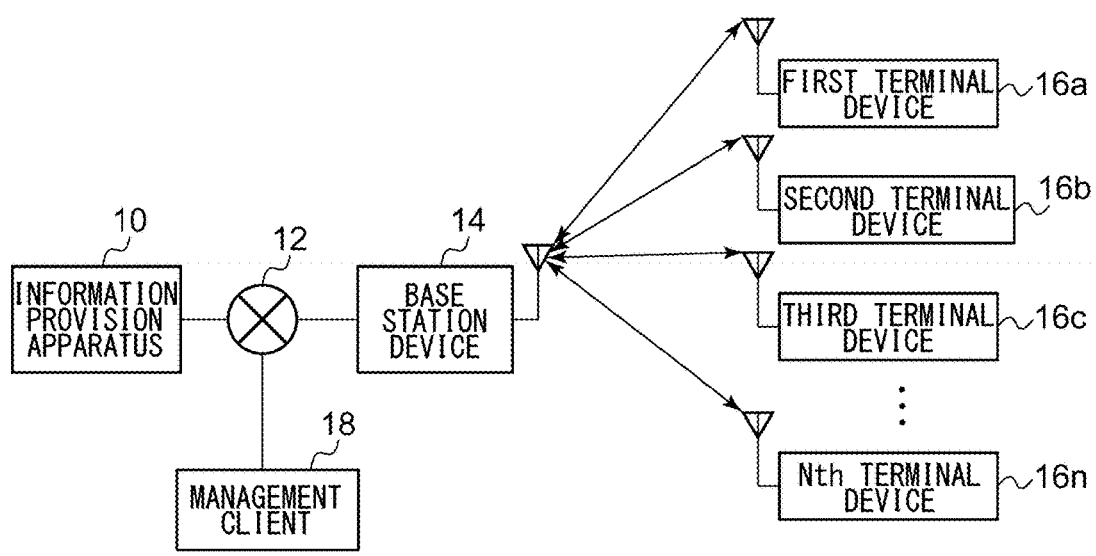
FIG. 1 is a diagram illustrating a configuration of an information provision system according to a first embodiment.

FIG. 1 illustrates a configuration of an information provision system 100 according to the first embodiment. The information provision system 100 includes an information provision apparatus 10, a network 12, a base station device 14, a first terminal device 16a, a second terminal device 16b, a third terminal device 16c, and an Nth terminal device 16n that are collectively referred to as terminal devices 16, and a management client 18.

The terminal devices 16 correspond to a wireless communication system, and connect to the base station device 14 to be described later. As an example of the wireless communication system, there are a mobile-phone system, a wireless local area network (LAN) system, an industrial wireless system, and the like. Nevertheless, the wireless communication system is not limited to these. The terminal devices 16 are mobile phones, smartphones, tablet terminals, notebook personal computers (PCs), wireless devices, and the like, and are configured to be easily-portable by users. The terminal devices 16 have a function of deriving location information (latitude, longitude, etc.) using the Global Positioning System (GPS), a wireless LAN, or the like. In addition, in addition to the GPS data derivation function, the terminal devices 16 may include an acceleration sensor and a gyro sensor, and may be configured to calculate more accurate location information using these sensors.

On one end side, the base station device 14 supports the same wireless communication system as the terminal devices 16, and can connect the terminal devices 16. In addition, on the other end side, the base station device 14 connects the network 12. The network 12 is connected to the base station device 14. The network 12 may be any network, and may be, for example, a wired network, a wireless network, or a combination of these networks.

The information provision apparatus 10 is connected to the network 12. With such a configuration, the terminal devices 16 can communicate with the information provision apparatus 10 via the base station device 14 and the network 12. Thus, the terminal devices 16 transmit derived location information to the information provision apparatus 10 via the base station device 14 and the network 12. Based on the received location information, the information provision apparatus 10 constructs information, and transmits the information to the management client 18 to be described later, via the network 12 and the base station device 14. Processing in the information provision apparatus 10 will be described later.

The management client 18 is a device used by an operator of a shop or the like. The management client 18 includes an inputter such as a keyboard and a mouse, and a display unit such as a display, and a general PC can be used. In addition, a plurality of the management clients 18 may exist. The management client 18 is connected to the information provision apparatus 10 via the network 12. In addition, the network 12 for connecting the information provision apparatus 10 and the management client 18 may be the same as or be different from the network 12 for connecting the information provision apparatus 10 and the terminal devices 16.

Figure 2:
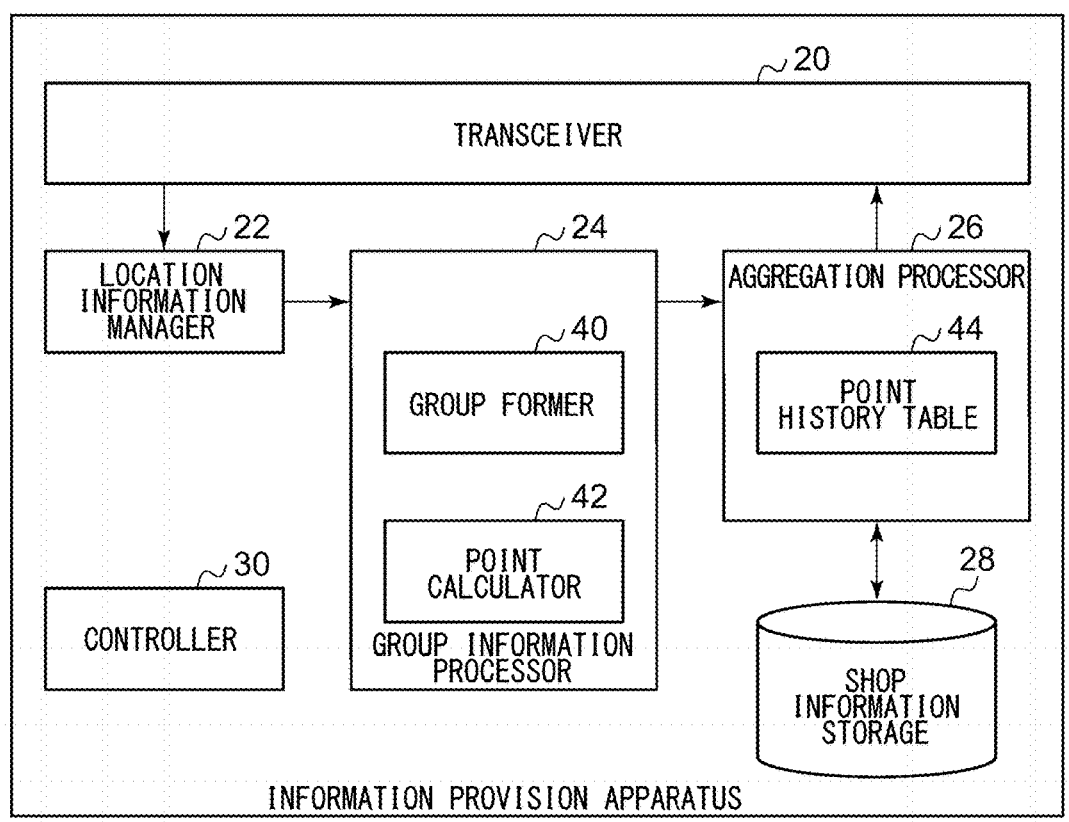
FIG. 2 is a diagram illustrating a configuration of an information provision apparatus illustrated in FIG. 1.

FIG. 2 illustrates a configuration of the information provision apparatus 10. The information provision apparatus 10 includes a transceiver 20, a location information manager 22, a group information processor 24, an aggregation processor 26, and a shop information storage 28. The group information processor 24 includes a group former 40 and a point calculator 42. The aggregation processor 26 includes a point history table 44. The information provision apparatus 10 uses a general computer including a central processing unit (CPU), a random access memory (RAM), a read-only memory (ROM), a hard disk drive (HDD), a network interface, and the like, and can be implemented as a computer program executed therein. In addition, a distributed processing system may be constructed. In the distributed processing system, the functions of the units of the information provision apparatus 10 are shared by a plurality of computers. In addition, the information provision apparatus 10 and the management client 18 may be implemented in a single device (single computer).

The location information manager 22 stores a location information table in which location information periodically transmitted from the terminal devices 16 are associated with terminal IDs and time and date information. FIG. 3 illustrates an example of this, and illustrates a data structure of a database stored in the location information manager 22. The location information at least includes information of latitude and longitude. In addition to this, information of altitude, a moving direction, acceleration, and the like may be received from the terminal devices 16, and may be stored. In the present embodiment, assumption is made on a configuration in which a single user occupies a single terminal device 16 on his/her own for use, as in the case of mobile phones/smartphones. Thus, a terminal ID and a user ID are substantially identical. In the present embodiment, for each terminal ID, location information of a corresponding terminal and a leader point to be described later are managed. Nevertheless, a user ID for identifying a user may be used. As a matter of course, it is possible to support a configuration in which a plurality of users uses a single terminal device 16, by using user IDs. In addition, in some cases, the term "use subject identifier" is used in the sense of an identifier for uniquely identifying a use subject being a terminal or a user.

Using time-series location information stored in the location information manager 22, i.e., time-series data of location information of a plurality of use subjects, the group former 40 identifies terminal devices 16 estimated to act (move) together, and groups these terminal devices 16. Using the time-series location information, the point calculator 42 estimates the power of influence of a member in the group in making decision. In the present embodiment, the selection of a shop such as a restaurant is handled as an example of decision-making. Alternatively, other types of decision-making such as the selection of a commercial product may be handled. As an index indicating the power of influence of each member, a numerical value referred to as a leader point (power of influence value) is calculated by the group information processor. The calculation method of the leader point will be described in detail later.

FIG. 4 illustrates a data structure of a database stored in the shop information storage 28. In the present embodiment, a restaurant will be described as an example of shops. Needless to say, the shops are not limited to this. The shop information storage stores a shop information table in which shop IDs for identifying shops, the genres of meals served by the shops, the location information (latitude, longitude) of the shops, and categories ("Lp large," "Lp medium," "Lp small") related to the leader points that are to be described later are at least associated. In addition to this, the numbers of customers of the shops, pieces of information about price ranges of commercial products handled by the shops, pieces of information about average prices of single payments, pieces of information about average payment prices per person, and the like may be stored. In addition, a single shop may handle a plurality of food genres. For example, a certain shop may handle both "Chinese food" and "Japanese food."

Based on information of the group information processor 24 and the shop information storage 28, the aggregation processor 26 aggregates the number of customers of each shop by leader point type, and provides the number to the shop or an operating organization of a shopping mall or the like. The aggregation processor 26 will be described in detail later. A controller 30 is a processor that controls the entire information provision apparatus 10, and has a time measurement function such as a real-time clock. The transceiver 20 performs data transmission and reception between the management client 18 and terminal devices 16 via a network. For example, the transceiver 20 periodically receives location information, a terminal ID, and time and date information from each terminal device 16 via the base station device 14 and the network 12. In addition, the transceiver 20 transmits information of leader points and the like, to the management client 18 via the transceiver 20.

Figure 5:
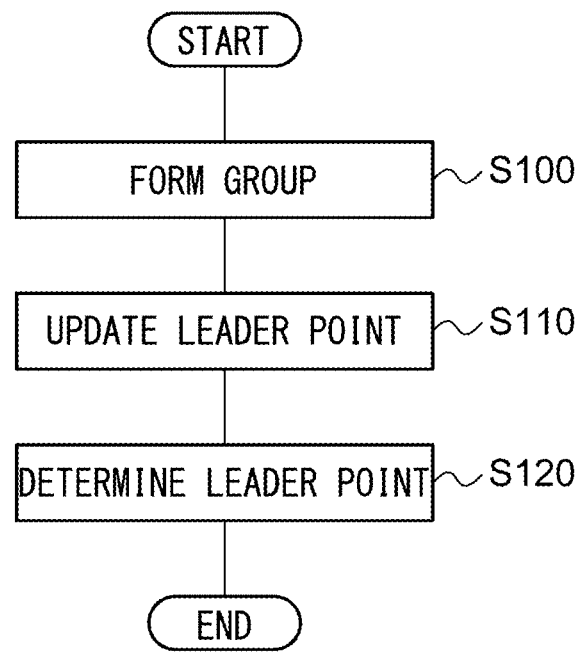
FIG. 5 is a flowchart illustrating a leader point determination procedure performed by the information provision apparatus illustrated in FIG. 2.

Next, an operation of the group information processor 24 will be described using a flowchart illustrated in FIG. 5. FIG. 5 is a flowchart illustrating a leader point determination procedure performed by the information provision apparatus 10. In step S100, the group former 40 forms a group including a plurality of subjects, based on time-series data of location information related to a plurality of subjects that are stored in the location information manager 22. The group corresponds to bringing together subjects estimated to act (move) together. In other words, the group former 40 determines which terminal device 16 belongs to the group, to form the group. More specifically, using data stored in the location information manager 22, the group former 40 determines whether a plurality of terminal devices 16 exists within a predetermined distance for a predetermined time or more. If a plurality of terminal devices 16 exists, the group former 40 determines these terminal devices 16 to be 1 group. The predetermined time is set to, for example, 1 to 10 minutes. In addition, the predetermined distance is set to, for example, 1 to 50 m.

Here, if time and date recorded by the location information manager 22 varies in some degree depending on terminal ID, it is desirable to correct latitude and longitude according to a difference in time and date among terminal IDs. For example, if time and date of the first terminal device 16a having a terminal ID "A" is "2015/03/20 10:11:25," and location information at the same time and date that corresponds to the second terminal device 16b having a terminal ID "B" does not exist, 2 pieces of location information at times and dates neighboring "2015/03/20 10:11:25" are extracted from among location information of the second terminal device 16b. If the 2 pieces of location information are, for example, "2015/03/20 10:11:00" and "2015/03/20 10:11:26," the latitude and longitude at "2015/03/20 10:11:25" of the second terminal device 16b are calculated by interpolating the 2 pieces of location information. In this example, a location for internally dividing a location at "2015/03/20 10:11:00" and a location at "2015/03/20 10:11:26" into 25:1 is calculated. In addition, the interpolation of location information is not limited to such linear interpolation, and nonlinear interpolation processing using 3 pieces of location information or more may be performed.

A method for performing group determination in the group former 40 will now be described using FIG. 6. FIG. 6 illustrates a data structure of a database stored in the group former 40. This indicates the first terminal device 16a to an eighth terminal device 16h that exist within an area of a predetermined range in a certain time zone (e.g., 2015/1/1 10:00 to 10:03), and an average distance (m) between the terminals. In addition, a terminal ID of the first terminal device 16a is indicated as "A," a terminal ID of the second terminal device 16b is indicated as "B," a terminal ID of the third terminal device 16c is indicated as "C," and a terminal ID of a fourth terminal device 16d is indicated as "D." In a similar manner, a terminal ID of the eighth terminal device 16h is indicated as "H." The average distance is a value obtained by calculating a distance between 2 arbitrary terminal devices 16 existing in a certain area, at every predetermined time interval (e.g., every 1 second) in a time period of a predetermined length (e.g., 3 minutes), and calculating an average of the obtained distances.

The group former 40 applies, to the data, a rule for determining terminals to be a group, if an average distance between the terminals is smaller than or equal to 10 m (a first threshold value). As a result, the first terminal device 16a to a fifth terminal device 16e are determined to be a first group, a sixth terminal device 16f and a seventh terminal device 16g are determined to be a second group, and the eighth terminal device 16h is determined to be a third group. In addition, the group former 40 sets the minimum value on the number of terminals forming 1 group, and if the number of terminals is not satisfied, the group former 40 does not have to form a group. For example, if a condition that requires at least 3 or more terminal devices 16 is applied, in a data example illustrated in FIG. 6, only the first group is formed. In addition, the group former 40 may set the maximum value on the number of terminals forming 1 group. In addition, instead of an average value of distances between terminals in a predetermined time period, the group former 40 may calculate the maximum value of the distances, and form a group using the calculated maximum value. In addition, the group former 40 may calculate variance or standard deviation indicating the magnitude of variation in distance between terminals, and form a group using the calculated variance or standard deviation.

For example, if an average value of distances between terminals in a predetermined time period is smaller than or equal to the first threshold value, and standard deviation of distances between terminals is smaller than or equal to a third threshold value, the group former 40 may determine the terminals to be a group. Using standard deviation reduces the probability of erroneously recognizing terminal devices 16 not acting in a group, to be a group. In addition, if the number of candidate terminals forming 1 group is large to some extent, the group former 40 may execute processing of determining terminals to be 1 group, or the like, even if distances between group candidate terminals exceed the first threshold value, if the number of distances exceeding the first threshold value is smaller than or equal to a predetermined value, and the maximum value of distances is smaller than or equal to a second threshold value.

For example, in group determination processing, if the number of candidate terminal devices 16 of a certain group is larger than or equal to a predetermined value (e.g., 7), the following processing is performed. In this example, it is assumed that there are 10 candidate terminal devices 16 of a certain group, the maximum value of distances between a certain 1 terminal device 16 (hereinafter, referred to as "determination target terminal") among the 10 candidate terminal devices 16 and the other 9 terminal devices 16 is 18 m, the second largest distance is 10 m, and the maximum value of distances between the other 9 terminal devices 16 is 9 m. In this case, because the number of distances exceeding the first threshold value (e.g., 10 m) of group determination is 1, and this number is smaller than or equal to a predetermined value (e.g., 2), and the maximum value (18 m) of distances is smaller than or equal to the second threshold value (e.g., 20 m), the group former 40 determines that the determination target terminal also belongs to a group. In addition, the group determination processing is not limited to the above-described method. For example, the group former 40 may perform the group determination processing using processing of applying various known cluster analysis methods to distances between terminals, and associating a formed cluster with a group, or the like.

The group former 40 constructs a new group ID every time 1 group is formed, and stores the group ID into a storage in the group information processor 24 as a database illustrated in FIG. 7. FIG. 7 illustrates a data structure of a database stored in the group information processor 24. The database associates group IDs, terminal IDs (user IDs), and leader points (Lps), and is also referred to as a group information table. A leader point is a numerical value obtained by estimating the power of influence of a user in a group based on the action of the user in the group. As this numerical value becomes larger, it is indicated that the power of influence of the user (terminal device 16) is larger. In addition, time and date when a group is formed (group start time and date) may be further recorded in the database, though this is not illustrated in FIG. 7. In addition, time and date when a group is dissolved (group end time and date) may be further recorded in the database. For example, group IDs, terminal IDs (user IDs), leader points (Lps), group start times and dates, and group end times and dates may be stored in association with one another, as a group information table.

FIG. 7 illustrates a state in which a group with a group ID "G1" and a group with a group ID "G2" are formed. The example illustrated in FIG. 7 illustrates a state in which "G2" is formed after "G1" has been formed and dissolved. The group with the group ID "G1" is constituted by the first terminal device 16a, the second terminal device 16b, and the third terminal device 16c. The respective leader points are "20," "50," and "30." The calculation method of leader points will be described later. The group with the group ID "G2" is constituted by the first terminal device 16a, the third terminal device 16c, the sixth terminal device 16f, and the seventh terminal device 16g, and in an initial state in which the group is formed. In this manner, in the initial state in which the group is formed, leader points of the respective users are set to "0." In addition, leader points stored in the group information table are updated as needed until 1 group action ends. Furthermore, after the 1 group action ends, the leader points are saved with remaining at the same values, without being updated. The term "temporary point" may be used for representing a leader point in an update continued state.

Figure 8:
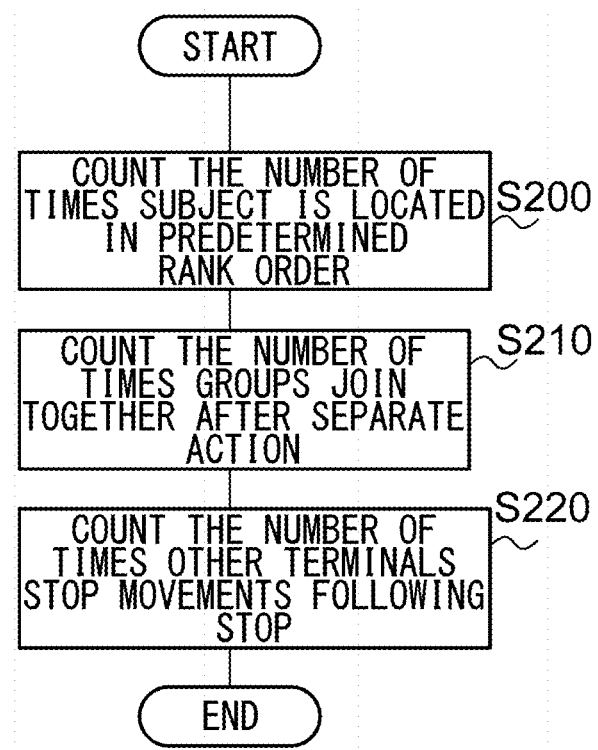
FIG. 8 is a flowchart illustrating a leader point update procedure performed by the information provision apparatus illustrated in FIG. 2.

Using time-series data of location information stored in the location information manager 22, the point calculator 42 estimates the power of influence of a user in a group in decision-making. Specifically, in step S110, the point calculator 42 calculates a power of influence value (leader point) as an index indicating the power of influence of each user. More specifically, the point calculator 42 analyzes time-series data of location information of each terminal ID, and calculates a feature action amount indicating a matching degree to a predetermined action pattern, based on which power of influence of a subject in a group is determined to be high, for each of a plurality of subjects included in the group. Furthermore, based on the feature action amount, the point calculator 42 calculates or updates a leader point (temporary point) of each subject. The processing will be described in detail below using a flowchart illustrated in FIG. 8.

The point calculator 42 calculates a leader point in such a manner as to be a higher value as the rank order defined according to a location of a subject is higher. Specifically, in step S200, the point calculator 42 defines that a subject is located in a predetermined rank order (order) from the front of the group, with respect to a moving direction of the group, as a first predetermined action pattern, and calculates the number of times the subject is located in the predetermined rank order, as a feature action amount. Typically, the point calculator 42 counts a precedence frequency of a user. The precedence frequency refers to the number of times the user is located at the forefront of the group, with respect to the moving direction of the group.

Figure 9:
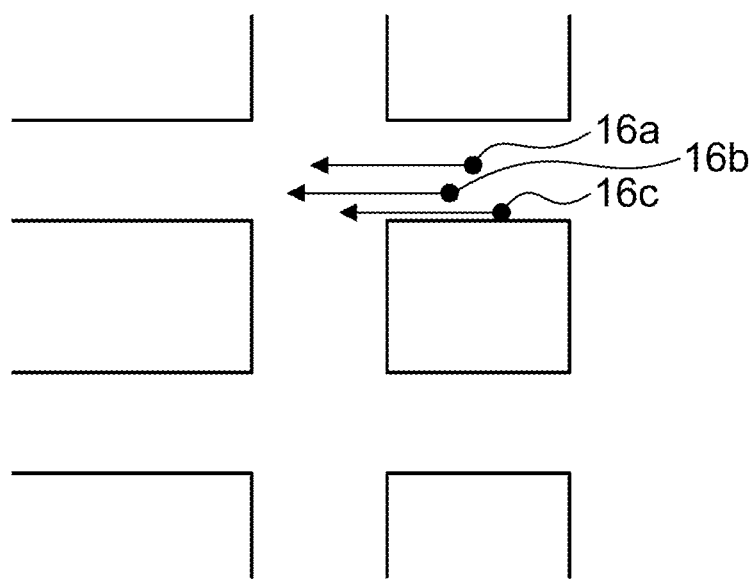
FIG. 9 is a diagram illustrating an overview of processing in a point calculator illustrated in FIG. 2.

The overview of the processing in step S200 will be described using FIG. 9. In the example illustrated in FIG. 9, the first terminal device 16a, the second terminal device 16b, and the third terminal device 16c are moving in a direction indicated by arrows. Based on terminal IDs and information of latitudes and longitudes that are stored in the location information manager 22, the point calculator 42 identifies a user in the group that is located at the front in a traveling direction, by comparing a predetermined number (e.g., 100) of immediately past latitude longitude information pieces, for example. In addition, the point calculator 42 counts the number of times a corresponding user is at a preceding location (precedence frequency), for each terminal ID. Furthermore, using the precedence frequency, the point calculator 42 calculates a power of influence value (leader point) indicating the power of influence of a user.

For example, it is assumed that, among 100 pieces of measured location information, the numbers of times the third terminal device 16c, the first terminal device 16a, and the second terminal device 16b are at the front are 60, 30, and 10, respectively.

In this case, the respective leader points of the third terminal device 16c, the first terminal device 16a, and the second terminal device 16b are set to "60," "30," and "10." Alternatively, if location information of each terminal device 16 is updated every predetermined time (e.g., every 5 seconds), the following processing may be performed. More specifically, a terminal device 16 located at the front of the group may be identified at every update timing, and the leader point thereof may be incremented by a predetermined value (e.g., "1").

In this manner, a feature action amount may be directly used as a leader point, or a value obtained by multiplying a feature action amount by a predetermined coefficient, or the like may be used as a leader point. Such processing is based on such perception that, when people are moving in a group, the power of influence of a user walking at the front of the group tends to be the largest. In particular, such a tendency is considered to appear more prominently when the group is moving while searching for an appropriate shop suitable for a certain purpose. The leader point can be said as an index indicating the power of influence of a group user in searching for/selecting an item such as a shop and a commercial product. The point calculator 42 adds the calculated leader point (leader point related to the precedence frequency) to a leader point in the group information table, to update the group information table.

In addition, the case in not limited to a case in which a user is located at the forefront, and the point calculator 42 may count the number of times a user is located in a predetermined rank order such as the second from the front and the third from the front. In addition, the point calculator 42 may calculate a feature action amount in such a manner as to be a larger value as the rank order of the location from the front becomes higher. In other words, the point calculator 42 may set a leader point to a larger value as the rank order of the location from the front becomes higher. This corresponds to adding a leader point with a varied value, according to the rank order (order) from the front. For example, if a user is located at the second from the front, a leader point being 50% of that when the user is located at the forefront is added, and if the user is located at the third from the front, a leader point being 20% of that when the user is located at the forefront is added.

In addition, the point calculator 42 may determine a location rank order from the front that is to be used in leader point calculation, according to the number of subjects included in the group. For example, if the number of people in the group is small (if the number is smaller than a first predetermined value), only the first location from the front is considered, and if the number of people in the group is medium, (if the number is larger than or equal to the first predetermined value, and smaller than a second predetermined value), the locations up to the second from the front are considered. In addition, if the number of people in the group is large (if the number is larger than or equal to the second predetermined value), locations up to the third from the front are considered.

The point calculator 42 may use not a precedence frequency but a distance by which a user has moved with being located at the front of the group, as a feature action amount, and calculate a leader point using the feature action amount. For example, it is assumed that, within a predetermined time, the first terminal device 16a moves by 500 m with being located at the front, the second terminal device 16b moves by 300 m with being located at the front, and the third terminal device 16c moves by 100 m with being located at the front. Under this situation, when a meter-based moving distance is used as a feature action amount, the respective feature action amounts are "500," "300," and "100." The point calculator 42 may use values obtained by multiplying feature action amounts by "0.1," as leader points, and calculate the respective leader points to be "50," "30," and "10." In other words, the point calculator 42 may calculate a leader point in such a manner as to be a larger value as a distance by which a user has moved with being located at the front is longer.

The point calculator 42 may use a length of a time for which each terminal device 16 is located at the front of the group, as a feature action amount, and calculate a leader point using the feature action amount. For example, it is assumed that, in 10 minutes (predetermined time), a time for which the first terminal device 16a has been located at the front is 2 minutes, a time for which the second terminal device 16b has been located at the front is 7 minutes, and a time for which the third terminal device 16c has been located at the front is 1 minute. Under this situation, when a minute-based time is used as a feature amount, the respective feature action amounts are "2," "7," and "1." The point calculator 42 may use values obtained by multiplying feature action amounts by "10," as leader points, and calculate the respective leader points to be "20," "70," and "10." In other words, the point calculator 42 may calculate a leader point in such a manner as to be a larger value as a time for which a user has been located at the front is longer. Furthermore, the point calculator 42 may calculate a leader point by arbitrarily combining feature action amounts related to the number of times a user is located at the front of the group, the time, and the distance.

Next, in step S210, if 1 group is divided into a plurality of groups, and then, the plurality of groups join together, the point calculator 42 defines a pattern in which a subject has been moving in a direction in which the group moves after the join, from the time of division, as a second predetermined action pattern, and calculates the number of times the groups join together after the division, as a feature action amount. At this time, the point calculator 42 determines whether a small group (including 1 user) joins, or is joined, with respect to a moving direction of the group after the join. More specifically, the point calculator 42 determines a small group that has been moving in the same direction as that after the join, from the time of division, to be a side of being joined, and adds a leader point of a user in the joined small group.

Figure 10A:
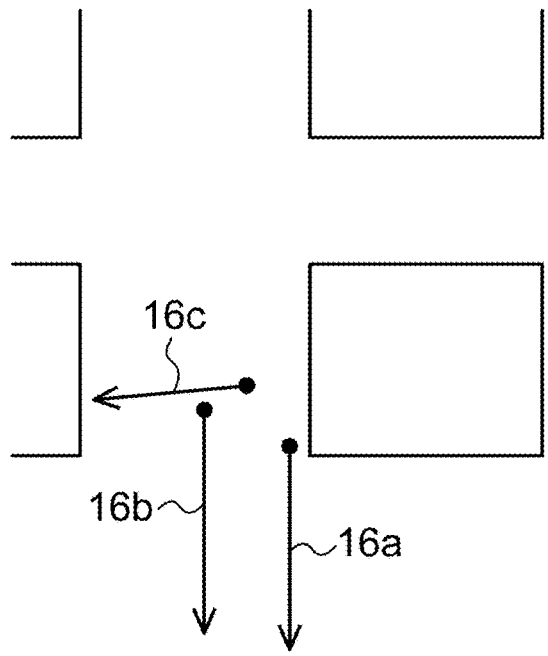
FIGS. 10A and 10B are diagrams illustrating an overview of another processing in the point calculator illustrated in FIG. 2.
Figure 10B:
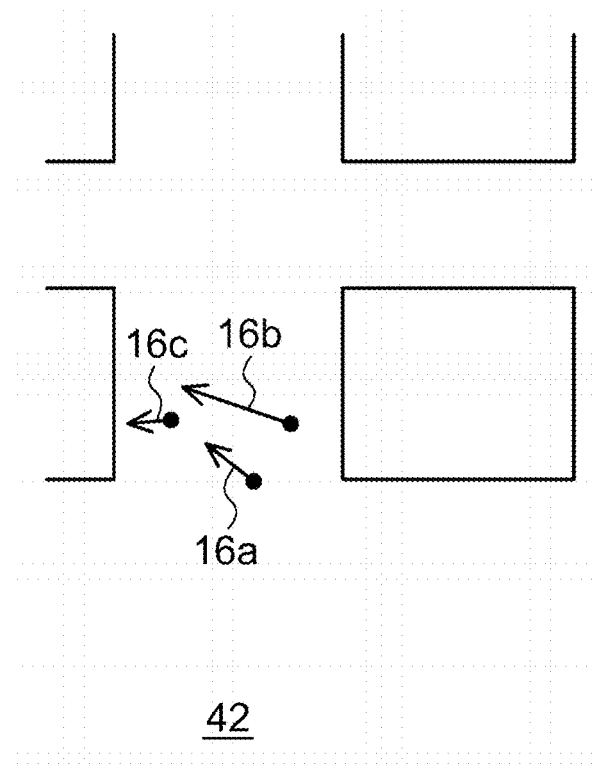

In this case, if a plurality of grouped terminal devices 16 act separately, and then, groups join together again, a terminal ID preceding in a joined group is considered to have power of influence on the group. The point calculator 42 therefore adds a leader point to this. FIGS. 10A and 10B illustrate an overview of another processing in the point calculator 42. In FIG. 10A, the first terminal device 16a and the second terminal device 16b, and the third terminal device 16c move in different directions. In FIG. 10B, subsequent to FIG. 10A, the first terminal device 16a and the second terminal device 16b join the third terminal device 16c, and the 3 terminal devices 16 move in the same direction. If such an action pattern is detected, the point calculator 42 adds a predetermined value (e.g., "30") to a leader point of a joined terminal device 16 (in this example, the third terminal device 16c), every time the join is performed.

In other words, by adding a leader point related to a joining action, to a leader point in the group information table, the point calculator 42 updates the group information table. In addition, if a joined small group is constituted by a plurality of users, the point calculator 42 may add leader points to those of all the users, or may add leader points to those of only users located in predetermined rank orders (e.g., the first and the second) from the front. In addition, the point calculator 42 may vary a leader point to be added, according to a rank order from the front in the joined small group. For example, the point calculator 42 adds leader points such as "30" for the front user, "20" for a user at the second from the front, and "10" for a user at the third from the front.

The point calculator 42 may calculate a leader point based on the number of subjects included in a small group obtained when a group is divided into a plurality of groups. In other words, the point calculator 42 may calculate a value of a leader point related to a joining action, according to the number of users that have separately acted (the number of users that have joined). Specifically, the point calculator 42 calculates a value of a leader point related to a joining action, in such a manner as to be a larger value as the number of users that have separately acted is larger (as the number of users in a small group that has joined is larger). For example, the point calculator 42 adds a leader point such as "20" if 2 users join after having separately acted, "30" if 3 users join after having separately acted, and "40" if 4 users join after having separately acted.

The point calculator 42 may calculate a value of a leader point related to a joining action, according to the number of users on a joined side. Specifically, the point calculator 42 calculates a leader point in such a manner as to be a smaller value as the number of users on a joined side is larger, and adds the calculated leader point to each of the users on the joined side. For example, if the number of users on the joined side is 1, the point calculator 42 adds a leader point such as "50," if the number of users on the joined side is 2, adds "30" to each of the 2 users, and if the number of users on the joined side is 3, adds "10" to each of the 3 users. In addition, if there is a plurality of users on the joined side, the point calculator 42 may add a leader point related to a joining action, to a user located at the front among the plurality of users. In other words, the point calculator 42 may calculate a leader point in such a manner as to be a smaller value as the number of users on the joined side is larger, and add a leader point related to a joining action, to a user located at the front. For example, if the number of users on the joined side is 1, the point calculator 42 adds a leader point such as "50," if the number of users on the joined side is 2, adds "40" to a user located at the front among the 2 users, and if the number of users on the joined side is 3, adds "30" to a user located at the front among the 3 users.

Next, in step S220, if a subject stops, the point calculator 42 defines, as a third predetermined action pattern, a pattern in which another subject also stops following the stop, and calculates the number of movement stops as a feature action amount. The stop following the stop refers to a situation in which, immediately after a certain terminal device 16 (e.g., the first terminal device 16a) stops movement, another terminal device 16 (terminal device 16 other than the first terminal device 16a in a group) stops movement. This situation is highly likely to be a situation in which a user that has stopped movement first finds a shop of interest or the like, and stops walking there to consider entering the shop. Thus, the point calculator 42 adds a predetermined value (e.g., "20") to a leader point of a terminal device 16 that has stopped movement first, every time another terminal device 16 stops movement once.

In other words, a leader point related to a stop action is added to a leader point in the group information table, so that the group information table is updated. Nevertheless, if a certain terminal device 16 stops movement but another terminal device 16 continues to move without stopping movement, it can be determined that the power of influence of a user that has stopped movement first is not so high. Thus, a leader point is not added.

The point calculator 42 may calculate a leader point based on the number of other subjects that have stopped following the stop. Specifically, the point calculator 42 calculates a leader point in such a manner as to be a larger value as the number of subjects that have stopped later is larger. For example, the point calculator 42 adds a leader point such as "20" if 2 subjects have stopped, "30" if 3 subjects have stopped, and "40" if 4 subjects have stopped. In addition, if there are both users that have stopped later, and users that continue to move without stopping, the point calculator 42 may calculate a leader point related to a stop action, according to a ratio of the users that have stopped later. For example, if the number of users that have stopped is Ns, and the number of users that continue to move is Nc, the point calculator 42 calculates the ratio of the users that have stopped, to be Ns/(Ns+Nc). Furthermore, the point calculator 42 adds a leader point such as "40" if this ratio is larger than or equal to 80%, "30" if the ratio is larger than or equal to 60% and smaller than 80%, "20" if the ratio is larger than or equal to 40% and smaller than 60%, and "0" if the ratio is smaller than 40%. In this manner, the point calculator 42 may calculate a leader point in such a manner as to be a larger value as the ratio of users that have stopped is larger.

When determining whether time-series data of location information of each terminal device 16 matches at least any 1 of the first to third predetermined action patterns, the point calculator 42 may make determination probabilistically, in addition to making determination deterministically. In this case, the point calculator 42 treats time-series data of location information as input, and uses a probability model for outputting a probability value corresponding to a predetermined action pattern of each terminal device 16.

For example, in the processing in step S200 for the first predetermined action pattern, in a case in which 2 terminal devices 16 from the front of a group are substantially side by side, the point calculator 42 calculates a probability of the first terminal device 16a being the first in a predetermined time period (e.g., 1 minute), to be "0.75" or the like. At this time, the point calculator 42 calculates a probability of the second terminal device 16b being the first, to be "0.25" or the like. The case in which 2 terminal devices 16 are substantially side by side refers to, for example, a case in which it is unclear which of the 2 terminal devices 16 is the first, a case of an unstable state in which the first and the second of the group frequently switch in a short period of time, and the like.

In addition, for example, in the processing in step S220 for the third predetermined action pattern, if the first terminal device 16a stops movement, and another terminal device 16 drastically reduces a movement speed, but slowly moves forward without stopping, the point calculator 42 calculates a probability of matching the third predetermined action pattern, to be "0.2" or the like. The point calculator 42 may directly use a probability value calculated in this manner, as a feature action amount, or may use a value obtained by multiplying the probability value by a predetermined coefficient (e.g., 100 times), as a feature action amount.

As described so far, a feature action amount can be said as an index indicating the degree (the number of times, time, distance, probability) of time-series data of location information of a certain subject matching a predetermined action pattern, based on which the power of influence of a subject in a group is determined to be high. Furthermore, a leader point is the total sum of feature action amounts of each subject in a predetermined time period (e.g., from a group formation time point to a group dissolution time point). Thus, the leader point has a property of becoming higher (larger) as the feature action amounts become larger. The leader point update processing has been described above.

The description will return to the flowchart illustrated in FIG. 5. In step S120, the point calculator 42 determines a leader point. The processing is performed every time 1 group action is completed. In other words, a leader point obtainable after the processing is executed can be said as an index indicating the power of influence of a member in 1 group action. Typically, if a group enters a certain shop, a group action is completed. Referring to a shop information table in the shop information storage 28 that is illustrated in FIG. 4, the point calculator 42 determines that a group has entered a shop, if terminal devices 16 belonging to the group stay at a location corresponding to the latitude and longitude of the shop, for a certain period of time or more. In addition, the execution of the processing is triggered by the group entering the shop. In addition, if the group enters a restaurant or the like, the execution of the processing may be triggered by members becoming seated (location information of the members not being changed for a certain period of time or more). In addition, the processing may be performed when a group action is canceled, and each member shifts to a separate action.

A first method of leader point determination is a method of directly using leader points accumulated up to the time point. In other words, in the group information table in the group information processor 24 that is illustrated in FIG. 7, a row of a corresponding group ID is prevented from being updated thereafter. It can be said that this method converts the power of influence of each member in a group into a numerical value as an absolute value. Based on an action history, the power of influence can be converted into a numerical value more minutely.

A second method of leader point determination is a method of performing normalization in such a manner that the total sum of leader points of each member in 1 group action becomes a constant value. Specifically, leader points of a corresponding group ID are readout from the group information table, and leader points of each member are normalized in such a manner that the total sum of these leader points becomes "1.0" or "100." For example, if a group G1 is constituted by 3 terminal devices 16 (A, B, and C), and their respective leader points are "20," "50," and "30," the leader points are normalized to be "0.2," "0.5," and "0.3" in such a manner that the sum becomes "1.0." Alternatively, normalization may be performed in such a manner that a leader point of a member having the largest leader point in 1 group becomes a predetermined value ("1.0," etc.). Such a normalized (relativized) leader point indicates relative power of influence of each member in 1 group action, and is easy to intuitively understand.

In the following description, unless otherwise specified, a leader point is assumed to be determined using the second method. Nevertheless, by executing some kinds of processing each time, the first method can be similarly used. The group information processor 24 stores determined leader points into the point history table 44 in the aggregation processor 26. As illustrated in FIG. 11, the point history table 44 is a table storing point history data, in which group IDs, terminal IDs, calculation times and dates (entrance times and dates), leader points, and shop IDs are associated (the point history table 44).

In addition, in step S120, additional processing of leader points may be further performed. Specifically, processing similar to that in steps S200 to S220 is performed on an action history of a group within a predetermined distance from a location of a shop that the group has entered, and leader points are further added, and then, normalization processing may be performed. Through the processing in steps S200 to S220, the action history in the vicinity of the shop that the group had entered has been already reflected in the leader points, but the processing in steps S200 to S220 adds leader points under certain conditions, regardless of a distance from the shop. Nevertheless, in the action history in the vicinity of the shop that the group had entered, the power of influence of a member in the group that is related to the selection of a shop is highly likely to appear more prominently, as compared with an action history in an area at long distance from the shop. Thus, by reflecting the action history in the vicinity area of the shop in leader points more strongly, the accuracy of leader points can be enhanced.

Thus, for example, within 100 m from the shop that the group has entered, if the first terminal device 16a is located at the front "8" times, and the second terminal device 16b is located at the front "2" times, processing corresponding to step S200 is executed, and leader points are added by "8" for the first terminal device 16a, and by "2" for the second terminal device 16b. The leader point additional processing in the vicinity area may be executed using the same condition as that in step S200, or a different condition may be set. For example, in step S200, if a point to be added is set to "1" point for each precedence frequency of 1, in the vicinity area, the point may be added using the same condition, or the condition may be changed in such a manner that "2" points or "0.5" points are added for each precedence frequency of 1. Also in steps S210 and S220, in the vicinity area of the shop, the leader point additional processing may be similarly performed.

Figure 12:
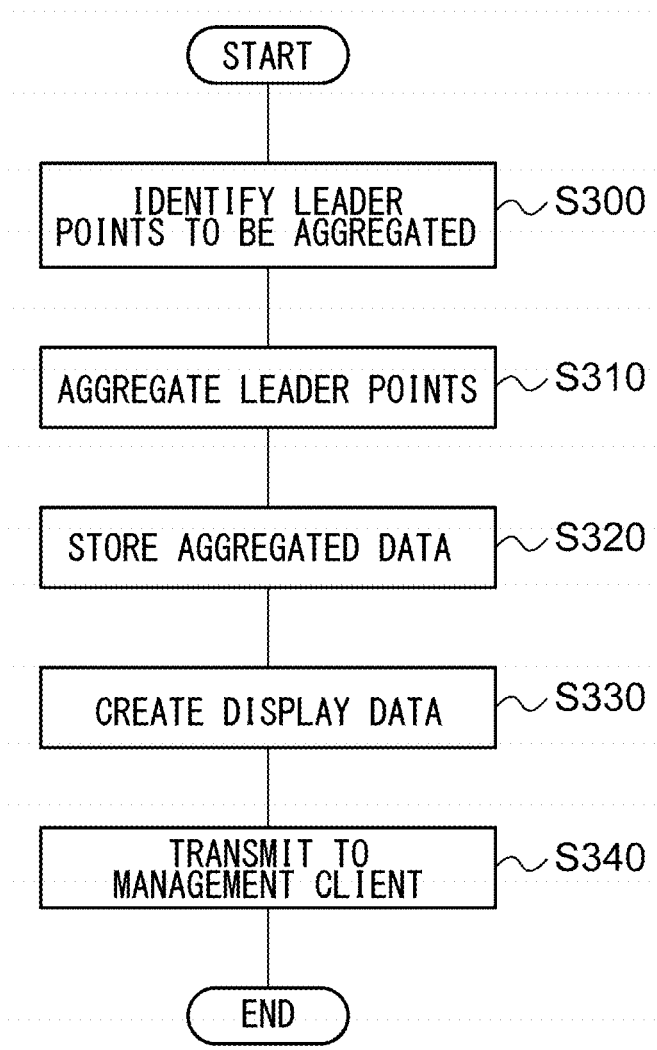
FIG. 12 is a flowchart illustrating a leader point aggregating procedure performed by the information provision apparatus illustrated in FIG. 2.

Next, an operation of the aggregation processor 26 will be described using a flowchart illustrated in FIG. 12. FIG. 12 is a flowchart illustrating a leader point aggregating procedure performed by the information provision apparatus 10.

The controller 30 gives an operation instruction to the aggregation processor 26 at a predetermined timing. As the predetermined timing, for example, the aggregation processor 26 is operated at a time interval such as once every day and once every hour, like batch processing. Alternatively, a time when a shop operator or an operator of a shopping mall performs a predetermined manipulation from the management client 18 may be used as the predetermined timing, and being triggered by this, the controller 30 may operate the aggregation processor 26.

First, in step S300, the aggregation processor 26 identifies leader points to be aggregated. A first identification method is a method of using an aggregating time period specified by an operator using the management client 18. This method is appropriate for a case in which the execution of aggregating processing is triggered by a predetermined manipulation of an operator. The operator specifies aggregating start time and date and aggregating end time and date, and transmits the information from the management client 18 to the information provision apparatus 10.

A second specification method is a method of setting current time and date at which processing is to be executed, as the aggregating end time and date, and setting a time period obtained by dating back a predetermined time period from the current time and date, as the aggregating start time and date. This method is appropriate for a case in which the aggregating processing is executed at predetermined time and date as batch processing. For example, if the aggregating start time and date is "00:00:00 a.m., Jan. 1, 2015," and the aggregating end time and date is 08:59:59 a.m., Jan. 31, 2015," the aggregation processor 26 scans the point history table 44 illustrated in FIG. 11, selects data with calculation time and date later than or equal to the aggregating start time and date and earlier than or equal to the aggregating end time and date, and uses the selected data as aggregating target data.

Next, in step S310, the aggregation processor 26 aggregates the aggregating target data for each shop ID. Specifically, using a predetermined rule (conversion rule), categories are determined according to the magnitudes of leader points, and the number of people in each category is counted. For example, if a value of a leader point (Lp) of each piece of aggregating target data is "larger than or equal to 0.6," the leader point is associated with a category called "Lp large," if the value is "larger than or equal to 0.4 and smaller than 0.6," the leader point is associated with a category called "Lp medium," and if the value is "smaller than 0.4," the leader point is associated with a category called "Lp small." Alternatively, if a leader point is calculated using the first method in step S120 (if the leader point is not normalized), for example, if a value of Lp is "larger than or equal to 120," the leader point is associated with the category called "Lp large." Furthermore, if the value is "larger than or equal to 50 and smaller than 120," the leader point is associated with the category called "Lp medium," and if the value is "smaller than 50," the leader point is associated with the category called "Lp small." Then, the number of terminal IDs (equivalent to the number of users) corresponding to each of the 3 categories is counted for each shop ID. Hereinafter, this category will be referred to as a "leader point category" or "Lp category."

In other words, by aggregating leader points calculated by the point calculator 42, the aggregation processor 26 calculates a leader point corresponding to each item. This is also referred to as an item point. At this time, a category is defined according to the magnitude of the leader point, and the aggregation processor 26 calculates a category-based distribution of leader points corresponding to each item, as item points, by aggregating leader points corresponding to each item, for each category.

In addition, in the present embodiment, there are 3 types of Lp categories. It should be appreciated that the number of categories other than this number may be used. For example, in the example illustrated in FIG. 11, 2 group IDs "G1" and "G7" correspond to a shop ID "S1," leader points corresponding to "G1" are "0.2," "0.5," and "0.3," and leader points corresponding to "G7" are "0.9" and "0.1." If these 5 leader points are associated with categories based on the above-described standard, "Lp large=1," "Lp medium=1," and "Lp small=3." The combination of these 3 pieces of information corresponds to an item point. Nevertheless, only partial information (e.g., "Lp large=1") of these 3 pieces of information may be used as an item point.

In addition, a classification standard (classification condition) of Lp categories may be changed according to the number of people in a group. If normalization is performed in such a manner that the total sum of group points in 1 group becomes "1," an average value (expected value) of leader points per person becomes smaller as the number of people in the group becomes larger. Thus, if the number of people in the group is small, a condition for classifying leader points into the Lp large is tightened (a threshold value corresponding to the Lp large is set to be large), and if the number of people in the group is large, a condition for classifying leader points into the Lp large is eased (a threshold value corresponding to the Lp large is set to be small). For example, a standard illustrated in FIG. 13 can be used. FIG. 13 illustrates a data structure of a database stored in the aggregation processor 26. The example illustrated in FIG. 13 indicates that, if the number of people in a group is "2," if a leader point (Lp) is "larger than or equal to 0.8," the leader point is associated with "Lp large," if the leader point (Lp) is "larger than or equal to 0.4 and smaller than 0.8," the leader point is associated with "Lp medium," and if the leader point (Lp) is "smaller than 0.4," the leader point is associated with "Lp small."

In addition, in step S310, a statistical value such as a representative value and a value indicating a dispersion degree of leader points related to a certain item may be further calculated as item points. As a representative value, any of an average value, a median value, and a mode value can be used. As a value indicating a dispersion degree of leader points, standard deviation, variance, (maximum value−minimum value), interquartile range (third quartile−first quartile), or the like can be used. Specifically, the aggregation processor 26 is only required to calculate, for each shop ID, a representative value (e.g., average value) of leader points, and a value indicating a dispersion degree (e.g., standard deviation) of leader points, using aggregating target data, which constitute at least part of the point history table 44 illustrated in FIG. 11. For example, in the example illustrated in FIG. 11, an average value of 5 data corresponding to a shop ID "S3" is calculated to be "(0.1+0.3+0.5+0.05+0.05)/5=0.2." In addition, standard deviation is about "0.18."

Next, in step S320, the aggregation processor 26 stores the data aggregated in step S310, into the shop information storage 28. The data calculated in step S310 are stored in the columns of "Lp large," "Lp medium," and "Lp small" in the shop information table illustrated in FIG. 4. In the example illustrated in FIG. 4, the number of customers per day, and an Lp category-based distribution of the numbers of customers are stored. In addition, if a representative value and a value indicating a dispersion degree of leader points related to a certain item are calculated in step S310, these values are also stored, although these are not illustrated in FIG. 4. In addition, information about a price range of commercial products provided by a shop may be stored.

Next, in step S330, the aggregation processor 26 creates display data for displaying on the management client 18, using data stored in the shop information storage 28. For example, if the management client 18 performs display using a Web browser, display data for displaying a table, a graph, and the like is created using a HyperText Markup Language (HTML) or a script language.

Next, in step S340, the controller 30 transmits the display data created in step S330, to the management client 18 via the transceiver 20. For example, the controller 30 is only required to receive a request from an Web browser installed on the management client 18 and transmit the display data as a response thereto, using a protocol such as a HyperText Transfer Protocol (HTTP). In addition, the display data may be transmitted by e-mail using a protocol such as a Simple Mail Transfer Protocol (SMTP). In this manner, the transceiver 20 outputs leader points calculated by the aggregation processor 26.

As described above, the management client 18 is configured to be able to communicate with the information provision apparatus 10. A receiver (not illustrated) in the management client 18 receives the display data indicating leader points, from the information provision apparatus 10. In addition, a controller (not illustrated) in the management client 18 performs control to display the received data on the display unit. Thus, if the display data is received from the information provision apparatus 10, based on the received display data, the management client 18 displays information related to leader points, on the display unit.

FIG. 14 illustrates information displayed on the management client 18, and this is an example of a display of item point information on the management client 18. FIG. 14 illustrates a result obtained by analyzing customers that have visited shops S11 to S14 in a predetermined time period, and illustrates the number of customers of each Lp category, and the total number of customers, in a tabular form. In the example illustrated in FIG. 14, the total number of customers that have visited the shop S11 and the total number of customers that have visited the shop S12 are both 18, but as for the shop S11, the number of customers of "Lp large" is the largest, and the number of customers of "Lp small" is the smallest. On the other hand, in contrast to this, as for the shop S12, the number of customers of "Lp large" is the smallest, and the number of customers of "Lp small" is the largest. The customers of "Lp large" can be said to often act actively in the selection of a shop.

In addition, such customers can be said to have relatively-high power of influence on other customers in the selection of a shop. In addition, such customers can be said to have a wealth of knowledge about shops, and to often act after determining a target shop in advance. The customers of such a type are highly likely to bring along friends, acquaintances, and the like to the shop, or introduce the shop to friends, acquaintances, and the like in the future. In other words, a shop with a large number of customers of "Lp large" has high possibility of increase in new customers in the future. In the example illustrated in FIG. 14, even though the number of customers that have visited the shop S11 and the number of customers that have visited the shop S12 are the same, it can be predicted that the number of customers visiting the shop S11 will increase in the future, and accordingly, the shop S11 is more promising. A shop operator or an operator of a shopping mall can easily view such shop-based distribution information of leader points. Thus, the shop operator or the operator of the shopping mall can determine renovation, a floor area increase, and a purchase plan of a shop, and a shop layout change in the shopping mall, more adequately and accurately.

Figure 15:
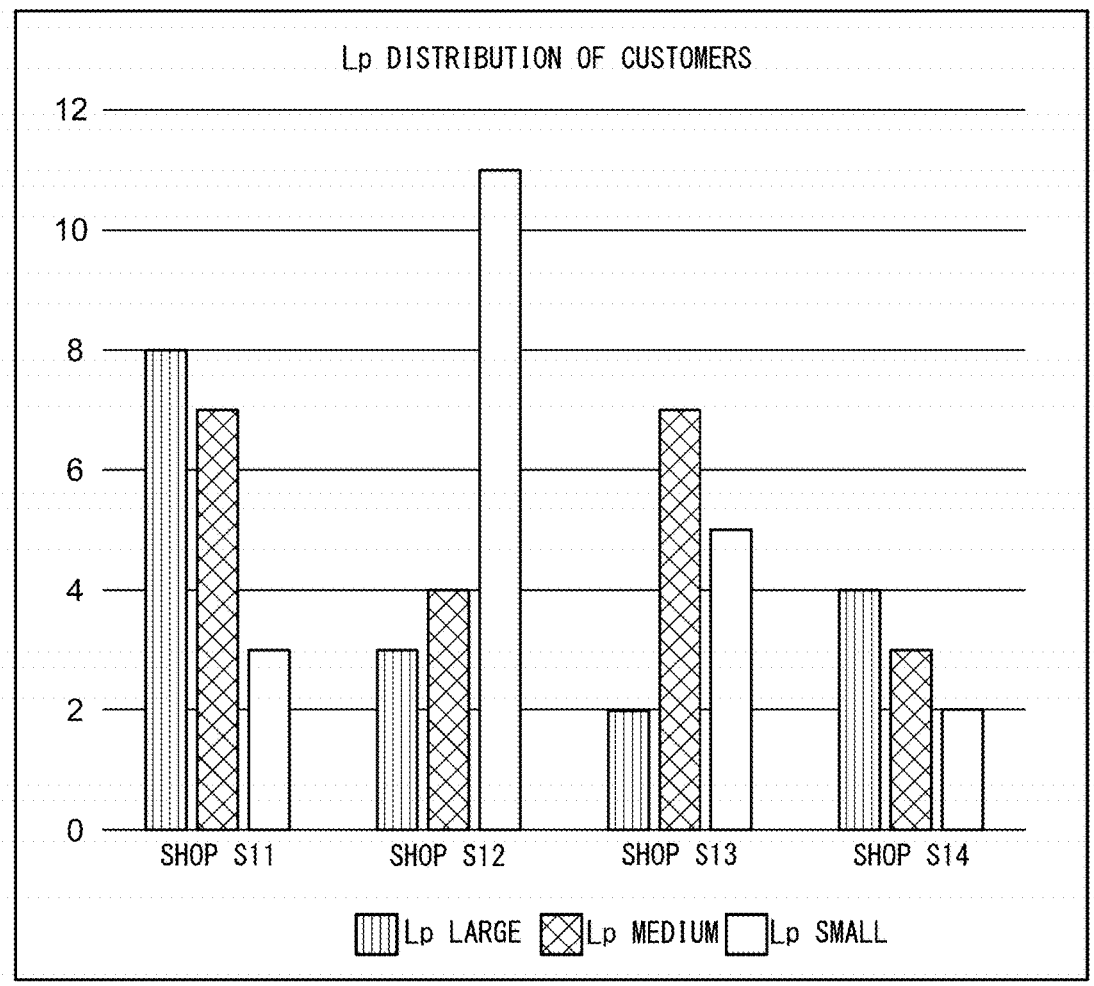
FIG. 15 is a diagram illustrating another information displayed on the management client illustrated in FIG. 1.

FIG. 15 illustrates another information displayed on the management client 18, and this is obtained by displaying the data illustrated in FIG. 14, as a graph. As compared with FIG. 14, differences in property among shops can be recognized further intuitively. For example, as for the shop S14, the absolute number of customers is currently small, but the ratio of "Lp large" is high. It can be therefore predicted that the number of customers is highly likely to increase in the future.

FIG. 16 is a layout diagram of shops in a shopping mall to be processed in the information provision system 100, and at a layout location of each shop, the numbers of customers in a certain specific time period are described by Lp category. In the example illustrated in FIG. 16, it can be seen that shops with 100 or more customers of Lp large are unequally-distributed, and concentrated in the shops S1, S4, and S5. By being provided with such information, the operator of the shopping mall can determine that "1 of the reasons why the numbers of customers of Lp large are relatively small in the shops S2, S3, S6, and S8 may be the layout of shops." The operator can further determine that, "by switching the shops S3 and S5, the movement route of customers changes, so that an increase in the number of customers of the shop S3 and neighboring shops can be expected," or the like.

Figure 17:
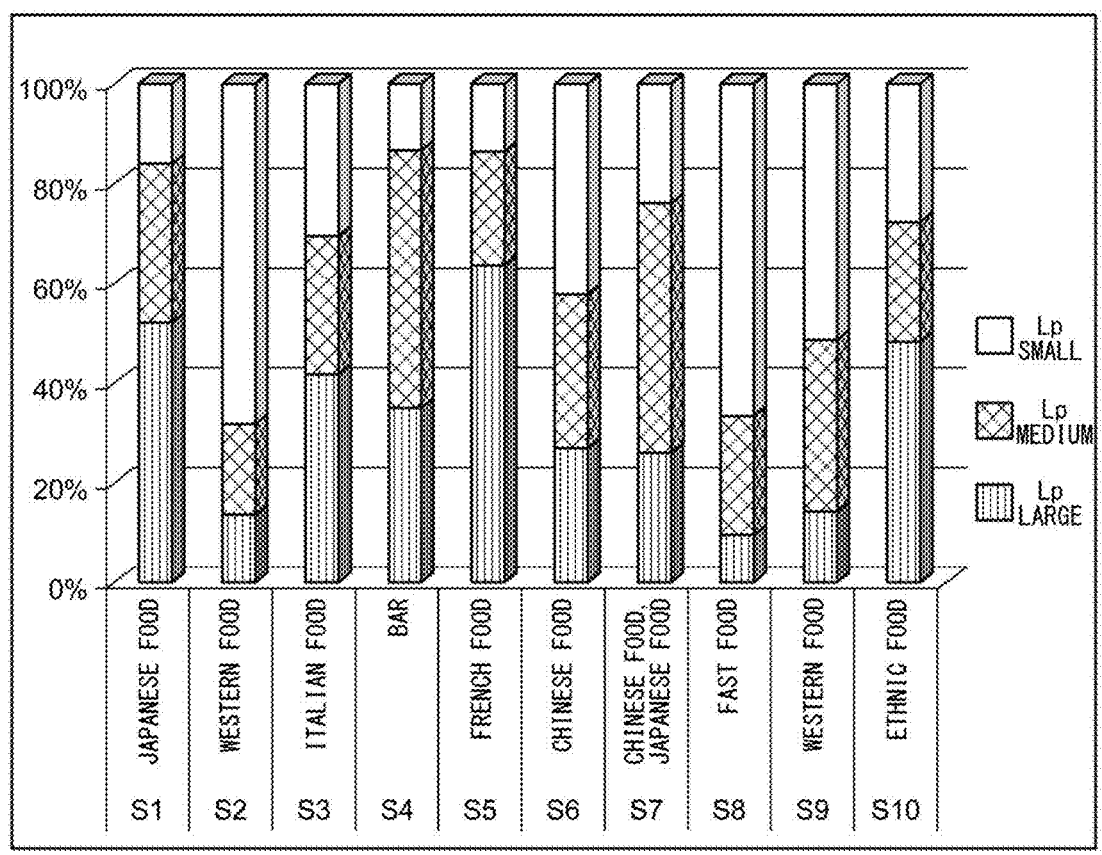
FIG. 17 is a diagram illustrating yet another information displayed on the management client illustrated in FIG. 1.

FIG. 17 illustrates yet another information displayed on the management client 18, and is a graph indicating Lp category-based ratios of customers for each shop. The 3 shops S1, S5, and S10 have relatively-larger "Lp large" customer ratios, and it can be determined that the number of new customers is highly likely to increase in the future. In addition, because these 3 shops have a common property of being preferred by people who actively act in the selection of a shop, it can be determined that a campaign or the like that is performed in the 3 shops in collaboration with one another is effective. For example, the following measures can be considered. When the shop S1 is crowded, the shop S5 or S10 can be introduced to customers of the shop S1 to guide the customers to the shop S5 or S10. Alternatively, a coupon ticket that can be mutually used in the 3 shops can be issued. In addition, based on a leader point, a customer (user) to be provided with a coupon ticket or a priority service may be selected. For example, a coupon ticket may be provided to customers with leader points satisfying a specific condition, among customers that have visited the shop S1. For example, a coupon ticket may be provided to customers of "Lp large," or customers with leader points larger than or equal to "0.6." Customers with high leader points are highly likely to introduce the shop to friends, acquaintances, and the like of the customers. Thus, an effect of increase in new customers by a larger number can be expected, and an efficient promotion activity can be performed.

Figures 18A, 18B:
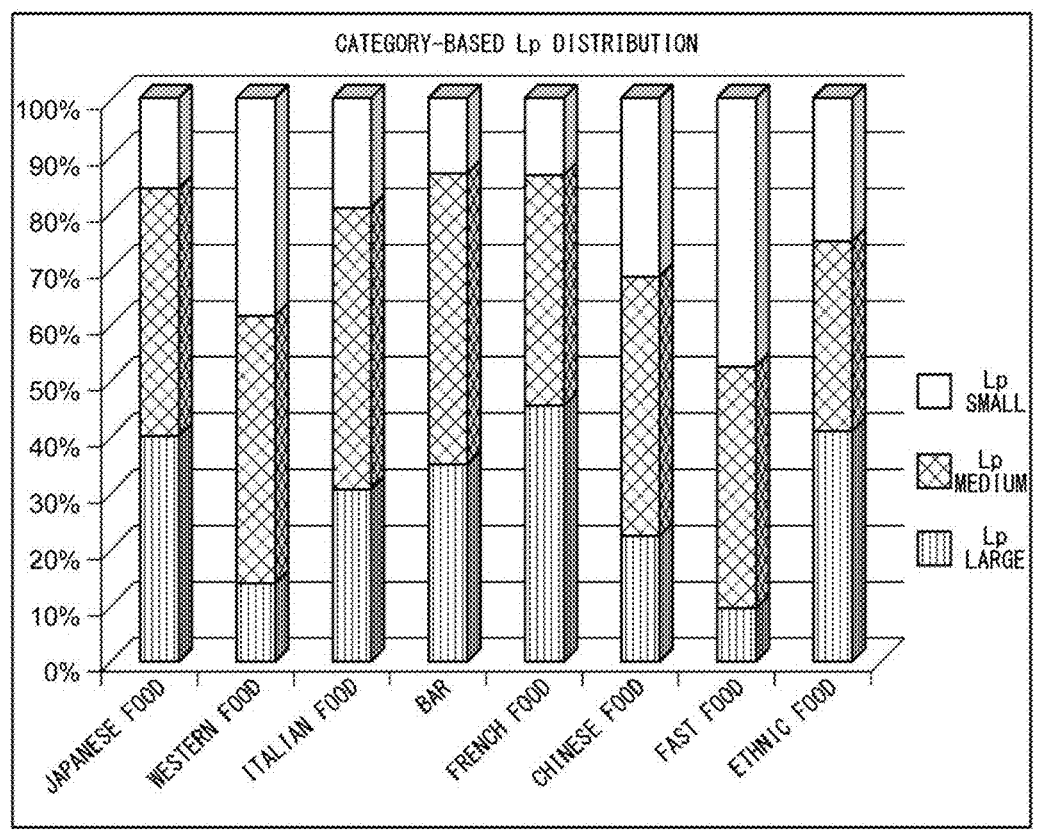
FIGS. 18A and 18B are diagrams illustrating yet another information displayed on the management client illustrated in FIG. 1.

FIGS. 18A and 18B illustrate yet other information displayed on the management client 18, and these information correspond to another example of displaying distribution information of leader points. Here, FIG. 18A illustrates a graph display, and FIG. 18B illustrates a table display. Such displays can be performed by aggregating the numbers of customers by Lp category, for each genre, in the shop information table illustrated in FIG. 4. FIGS. 18A and 18B each illustrate a distribution of leader points of shops located in a specific area in a shopping mall or the like, not by shop but by food genre. In FIGS. 18A and 18B, in 3 genres of "Japanese food," "French food," and "ethnic food," the ratios of "Lp large" are high. Thus, these 3 genres are predicted to have relatively-higher possibility of increase in new customers in the future. The operator of the shopping mall can utilize such information for creating a future business plan. For example, the operator can increase shops of these 3 genres. In addition, a campaign of mutually guiding customers to shops of these 3 genres, or the like is also considered to be effective.

Figures 19A, 19B:
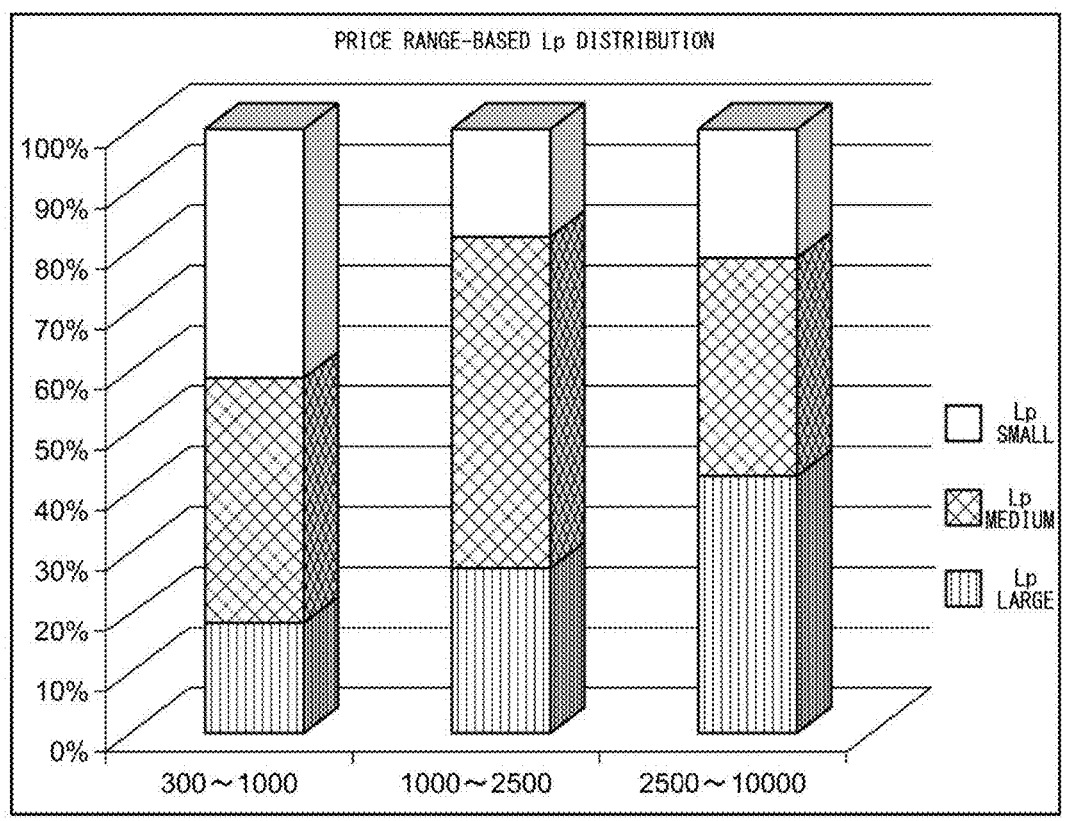
FIGS. 19A and 19B are diagrams illustrating yet another information displayed on the management client illustrated in FIG. 1.

FIGS. 19A and 19B illustrate yet other information displayed on the management client 18, and these information correspond to an example of aggregating a plurality of shops and displaying distribution information of leader points by price range of commercial products handled in shops. Here, FIG. 19A illustrates a graph display, and FIG. 19B illustrates a table display. These price ranges indicate, for example, main price ranges of menus in restaurants. In FIGS. 19A and 19B, as for shops handling commercial products in a price range of "2500 yen to 10000 yen," the ratio of "Lp large" is higher as compared with those of shops handling commercial products in other price ranges. Thus, the operator of the shopping mall can determine that increasing the number of shops handling commercial products in the price range of "2500 yen to 10000 yen" possibly leads to an increase in sales of the shopping mall in the future.

In addition, after a group has entered a shop, location information of terminal devices 16 in the shop may be collected and provided to the management client 18. For example, the location information of the terminal devices 16 in the shop are continuously recorded in the location information table illustrated in FIG. 3. Then, by extracting data corresponding to the shop that the group has entered, from the point history table 44, and combining the data with the location information table using terminal IDs as keys, the location information of the terminal devices 16 and leader points of the terminal devices 16 can be associated with each other. In addition, in this case, the aggregating processing in the aggregation processor 26 may be omitted, and only leader points related to the entering performed this time (leader points in 1 group action) may be associated. Alternatively, a representative value (average value, median value, mode value. etc.) of leader points of the terminal devices 16 in the past 1 week or the past 1 month may be calculated by the aggregation processor 26, and associated.

The aggregation processor 26 creates display data for displaying leader points of the respective terminal devices 16 on a map showing the inside of the shop. Then, the controller 30 transmits the display data to the management client 18 via the transceiver 20. By viewing such information, staffs of the shop that the group has entered can recognize how much leader points customers currently existing in the shop have. Then, the enhancement in customer services and the increase inefficiency can be achieved by preferentially presenting menus or wine lists to customers with high leader points, for example.

In the present embodiment, the description has been given of the method of calculating leader points using latitude and longitude information of terminal devices 16 that are stored in the location information manager 22. Nevertheless, other methods can also be used. For example, the processing equivalent to steps S100 and S110 may be performed by analyzing images/videos obtained by monitoring cameras installed in a shopping mall or a shopping street, and using an image recognition method. In this case, there is no need for users to carry terminal devices 16. In addition, latitude and longitude information is not always necessary. It is sufficient that a relative location relation between members in a group, and relative movement information can be derived. In addition, by interfacing a monitoring camera installed at a passage way of the shopping mall or the shopping street, and a monitoring camera installed at a shop entrance, and using a facial recognition technology, staffs can recognize which customer has a high leader point and which customer has a low leader point, at the time when the customers enter the shop. By recognizing such information, the enhancement in customer services and the increase in efficiency can be achieved by preferentially presenting menus or wine lists to customers with high leader points, for example.

In addition, a group action history in a shop may be derived, and the power of influence related to commercial product selection may be estimated. For example, a leader point (power of influence value) related to commercial product selection may be calculated by performing processing of identifying a member that has first arrived at a shelf of a commercial product purchased by a certain member, and adding a leader point of the first-arrived member, for example. In other words, according to the present embodiment, a selection target object is not limited to shops, and a leader point (power of influence value) related to the selection of an item including commercial products and the like can be calculated.

In addition, after leader points related to commercial product selection are calculated, the number of purchasers of each leader point category may be aggregated by commercial product. For example, this can be achieved by changing the shop-based display illustrated in FIG. 15, to a commercial product-based display. By being provided with such information, a shop operator can predict that "demands for commercial products with higher ratios of Lp large are highly likely to increase in the future," for example.

In addition, in the above description, the aggregation processor 26 calculates a leader point corresponding to each item, by aggregating leader points calculated by the point calculator 42. Nevertheless, another method may be used. For example, leader points related to a specific item may be extracted from the point history table 44 illustrated in FIG. 11, and in association with the item (information related to the item), a list of the extracted leader points may be provided to the management client 18 and displayed thereon. For example, in the example illustrated in FIG. 11, 5 leader points "0.2," "0.5," "0.3," "0.9," and "0.1" correspond to the shop ID "S1." A list of these 5 leader points may be displayed in association with the shop "S1." In this case, the aggregation processor 26 can be omitted. In addition, as information related to an item, a shop ID, a shop name, a shop address, a shop phone number, and the like can be used. If the number of leader points related to an item is small, for example, in some cases, providing non-aggregated raw data may be more beneficial for a shop operator, rather than information obtained by aggregating leader points. Thus, in such a case, it is desirable to provide information of each individual leader point stored in the point history table 44 in this manner.

According to the present embodiment, because a group is formed based on time-series data of location information, a plurality of subjects acting together can be grouped. In addition, because grouping is automatically performed, usability for users can be enhanced. In addition, a leader point is calculated after a feature action amount indicating a matching degree to a predetermined action pattern, based on which the power of influence of a subject in a group is determined to be high, is calculated based on time-series data of location information. Thus, a leader point can be derived in consideration of the power of influence of a user in a group.

Information (an item point) obtained by aggregating, for each item, leader points indicating estimated power of influence of members in a group that is related to the selection of an item (shop or commercial product) can be provided to a shop operator or the like, without placing a burden on customers and operators of shops. With this configuration, the property of each item can be clearly conveyed to a shop operator and the like, from a nonconventional new aspect. For example, information helpful for demand prediction such as information indicating that "the demand for an item used by a customer with a high leader point is expected to further increase in the future" can be provided. In addition, information helpful for a sales promotion strategy such as information indicating that "because customers with high leader points are estimated to have strong power of influence on other customers, it is efficient to perform promotion such as advertisement and priority that is targeted for customers with high leader points" can be provided. In addition, information helpful for collaboration between a plurality of shops such as information indicating that "because customer segments of shops having similar distribution patterns of leader points can be determined to be similar, it is effective for increasing the sales of the entire region to mutually guide customers to such shops, or to execute a campaign by causing a plurality of shops to collaborate with each other" can be provided. In addition, information helpful for the enhancement in customer services and the increase in efficiency such as information indicating "which customer has a high leader point, in a customer group that has entered a shop" can be provided.

In addition, at least one of the number of times a movement pattern of a subject in time-series data of location information matches a predetermined action pattern, a time in which the movement pattern matches the predetermined action pattern, a movement distance in which the movement pattern matches the predetermined action pattern, and a probability at which the movement pattern matches the predetermined action pattern is calculated as a feature action amount. Thus, a feature action amount suitable for a matching degree of an action pattern can be derived. In addition, a leader point is calculated in such a manner as to be a higher value as a feature action amount becomes larger. Thus, a leader point suitable for a matching degree of an action pattern can be derived. In addition, because the predetermined action pattern is a pattern in which a subject is located at a location in a predetermined rank order from the front of the group, with respect to a moving direction of the group, the power of influence of a user that is set according to the location where the user in the group exists can be estimated with high accuracy. In addition, because a leader point is calculated in such a manner as to be higher as the predetermined rank order becomes higher, the power of influence of a user existing at a front portion of the group is estimated to be large.

In addition, the predetermined action pattern is a pattern in which, if a group is divided into a plurality of groups, and then, the plurality of groups join together, a subject has been moving in a direction in which the group moves after the joining, from the time of division. Thus, the power of influence of a user can be estimated with high accuracy. In addition, a leader point is calculated based on the number of subjects included in a small group obtained when a group is divided into a plurality of groups. Thus, the magnitude of the power of influence can be estimated with high accuracy. In addition, the predetermined action pattern is a pattern in which, if a subject stops, another subject also stops following the stop. Thus, the power of influence that is exerted when the subject stops can be estimated. In addition, a leader point is calculated based on the number of other subjects that have stopped following the stop. Thus, the magnitude of the power of influence can be estimated with high accuracy. In addition, a leader point is calculated based on the number of subjects included in the group. Thus, the magnitude of the power of influence can be estimated with high accuracy.

Second Embodiment

Next, the second embodiment will be described. Similarly to the first embodiment, the second embodiment relates to an information provision system. An information provision apparatus 10 according to the second embodiment also forms a group using location information of a plurality of terminal devices 16 and estimates the power of influence of each user in the group. When estimating the power of influence of each user, the information provision apparatus 10 also uses attribute information of a corresponding user. The information provision system 100 according to the second embodiment is of a similar type to that in FIG. 1. A difference will now be mainly described.

Figure 20:
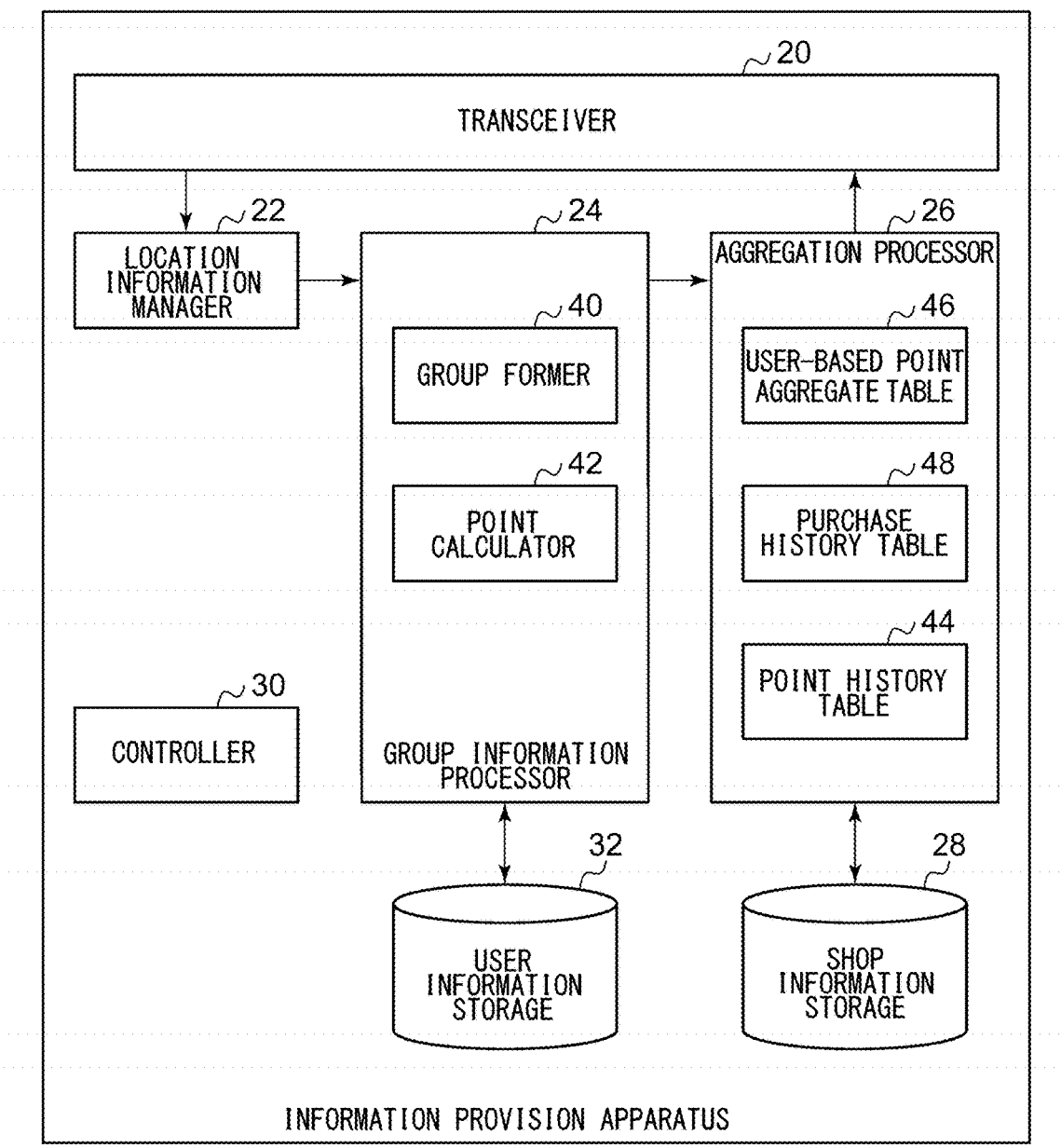
FIG. 20 is a diagram illustrating a configuration of an information provision apparatus according to a second embodiment.

FIG. 20 illustrates a configuration of the information provision apparatus 10 according to the second embodiment. The information provision apparatus 10 is configured similarly to that in FIG. 2, but a group information processor 24 is configured to be able to refer to a database stored in a user information storage 32. A point calculator 42 uses not only location information but also attribute information (age, gender, etc.) of a user corresponding to a subject to estimate the power of influence in a group, thereby calculating a leader point. The user information storage 32 stores user attribute information.

FIG. 21 illustrates a data structure of a database stored in the user information storage 32. User attribute items such as terminal IDs (or user IDs), dates of birth, genders, places of work, titles, annual incomes, and pocket money of this month are stored in association with each other. This is an example, and data of a user attribute item other than these may be stored, or part of the user attribute items may be stored. The description will return to FIG. 20.

The point calculator 42 in the first embodiment calculates a leader point that is based on location information. In addition to this, the point calculator 42 in the second embodiment calculates a leader point that is based on user attribute information. Furthermore, the point calculator 42 calculates a comprehensive leader point using 2 leader points. In the following description, a leader point that is based on location information of a terminal device 16$i$ is denoted by Pg[i], a leader point that is based on user attribute information is denoted by Ph[i], and a comprehensive leader point is denoted by P[i]. The point calculator 42 calculates a leader point Ph[i] that is based on user attribute information, using the following method.

A first method is a method of calculating the leader point Ph[i] based on a rule set for each user attribute item. For example, generally, the power of influence of an older user is high. Thus, the leader point Ph[i] can be calculated based on the date of birth. Specifically, based on the date of birth of a user in a group, the point calculator 42 gives a leader point of a larger value as the age becomes higher. For example, the point calculator 42 gives leader points such as "10" to the oldest user, "7" to the second oldest user, and "5" to the third oldest user. In addition, the point calculator 42 may set the maximum value of leader points to be given, to 1, and give a leader point with a value larger than 0 and smaller than or equal to 1, according to the age. In addition, the point calculator 42 may introduce such a rule that, if a difference in age between users whose age rank orders differ from each other by 1 is smaller than or equal to a predetermined value, the age difference is ignored and the same leader point is given.

In addition, the point calculator 42 may use such a rule that a larger leader point is given to a user with higher title. For example, the point calculator 42 gives leader points such as "10" to a company president, "5" to a general manager, and "2" to a sectional chief. In addition, the point calculator 42 may calculate a leader point according to the amount of annual income or pocket money of this month. For example, because a user with higher annual income tends to have higher power of influence, a value obtained by multiplying annual income by a predetermined coefficient (0.1%, etc.) can be used as a leader point Ph[i]. In addition, the point calculator 42 may give leader points such as "10" to a user with the highest annual income, and "8" to a user with the second highest annual income, or may give a predetermined leader point according to the order of annual income. The same applies to pocket money of this month, but in some cases, pocket money of this month indicates the amount that can be used by each user in a restaurant or the like, more accurately. Thus, the power of influence may be estimated more accurately, rather than using annual income. In addition, the point calculator 42 may calculate a leader point based on gender.

A second method is a method of using a plurality of user attribute items, and adding leader points calculated for each user attribute item. In other words, the point calculator 42 calculates a leader point based on a plurality of items included in attribute information of a user. First, as for date of birth, the point calculator 42 uses such a rule that "a leader point becomes higher as age becomes higher" as described in the first method, and calculates a leader point Ph[1] [i]

related to date of birth. Next, as for title, the point calculator 42 uses such a rule that "a leader point becomes higher as title becomes higher" as described in the first method, and calculates a leader point Ph[2] [i] related to title. In this manner, for L user attribute items, the point calculator 42 calculates leader points Ph[l] [i] (l=1 to L, i=1 to N), and calculates a leader point Ph[i] that is based on user attribute information, in the following manner. In the following equation, w[l] (l=1 to L) is a predetermined weight coefficient defined for each user attribute item, and w[l]>0.

[Equation 1]

$$Ph[i] = \sum_{l=1}^{L} w[l] Ph[l][i] \qquad (1)$$

A third method is a method of calculating a leader point based on a rule set using a combination of a plurality of user items. For example, the point calculator 42 calculates a leader point of a user whose date of birth is in a predetermined range, and who is of predetermined gender, to be relatively high. For example, female in a specific age group tends to have high level of demand for restaurants. Thus, a predetermined leader point is given to a user whose date of birth is in a predetermined range, and whose gender is female, so that the preference of such a user can be easily reflected in decision-making of a group. This third method may be independently used, or may be used in combination with other methods. For example, the point calculator 42 may perform processing of first calculating a leader point according to Equation (1), and secondly adding a leader point "10" to a user whose date of birth is in a predetermined range, and who is of predetermined gender.

A fourth method is a method of using a rule that is set in consideration of an organization to which a user belongs. At this time, the point calculator 42 refers to information stored in the user information storage 32. FIG. 22 illustrates a data structure of another database stored in the user information storage 32. This indicates business relation between companies. This indicates a situation in which a company X issues an order of a job to a company Y, and furthermore the company Y issues an order of a job to a company Z. Generally, people in a company that receives an order often select a shop such as a restaurant according to the preference of people in a company that issues the order. Thus, such a tendency is reflected in leader points. In the examples illustrated in FIGS. 21 and 22, leader points of users with a place of work=X are the highest, and leader points of users with a place of work=Y are the second highest, and leader points of users with a place of work=Z are the lowest. In addition, if there is a plurality of users with the same place of work, leader points of the users may be set to the same value, or leader points may be set to different values using an attribute item such as date of birth, gender, and title.

A fifth method is a method of using a relation between date of birth and date (current time and date) at which processing is performed. For example, if a date at which a leader point is calculated is May 3, 2015, and a user whose date of birth is May 3, 1979 exists in a group, a birthday party or the like for the user is possibly performed. Thus, the point calculator 42 calculates a leader point of the user to be higher than usual. In other words, the point calculator 42 calculates a leader point of a user whose date of birth falls on or is close to a date at which processing is to be performed, to be relatively higher. In this manner, the point calculator 42 calculates a leader point according to a relation between a date at which processing is to be executed, and attribute information of a user.

A sixth method is a method of using a relation between gender and date (current time and date) at which processing is performed. For example, if current time and date at which a leader point is calculated falls on Mar. 14, 2015, i.e., a white day, a male is highly likely to select a restaurant according to the preference of a female. Thus, the point calculator 42 calculates a leader point of a female to be higher than usual. In addition, the point calculator 42 may independently use any 1 of the above-described first to sixth methods, or may use a plurality of methods in combination.

Next, the point calculator 42 calculates a comprehensive leader point P[i] in the following manner. [Equation 2]

$$P[i] = \alpha 1 \times Pg[i] + \alpha 2 \times Ph[i] \qquad (2)$$

In this equation, a leader point that is based on location information of a terminal i described in the first embodiment is denoted by Pg[i], and a leader point that is based on user attribute information is denoted by Ph[i]. In addition, $\alpha 1$ and $\alpha 2$ are predetermined coefficients satisfying $\alpha 1>0$ and $\alpha 2>0$. In other words, the point calculator 42 executes weighted addition of the leader point that is based on location information and the leader point that is based on user attribute information. In addition, by setting $\alpha 1=1$ and $\alpha 2=1$, a sum (an additional value) of the leader point that is based on location information and the leader point that is based on user attribute information may be used as a comprehensive leader point.

In addition, the point calculator 42 may calculate a comprehensive leader point P[i] in the following manner.

[Equation 3]

$$Ph[i] = Pg[i]^{\gamma 1} \times Ph[i]^{\gamma 2} \qquad (3)$$

In this equation, γ1 and γ2 are predetermined values satisfying γ1>0 and γ2>0. In other words, a product (multiplication value) of a power value having a base number Pg[i] and an exponent γ1, and a power value having a base number Ph[i] and an exponent γ2 is denoted by P[i]. If it is desired to strongly reflect Pg[i] in P [i], γ1 is desirably set to a large value. If it is desired to strongly reflect Ph[i] in P [i], γ2 is desirably set to a large value. In addition, by setting γ1=1 and γ2=1, a product (multiplication value) of the leader point that is based on location information and the leader point that is based on user attribute information may be used as a comprehensive leader point. The point calculator 42 is only required to execute processing similar to the first embodiment, after calculating a comprehensive leader point P[i] based on Equation (2) or (3).

Similarly to the first embodiment, the information provision apparatus 10 creates display data, and transmits the created display data to the management client 18. The management client 18 can display a graph or a table as described below. FIG. 23 illustrates information displayed on the management client 18 according to the second embodiment, and this is an example of displaying a result obtained by classifying customers of a certain shop by gender and by age, and further aggregating the numbers of customers by leader point category, in a tabular form. Data for displaying this table is derived by the aggregation processor 26 combining the user attribute table illustrated in FIG. 21 and the point history table 44 illustrated in FIG. 11, using terminal IDs as keys, and aggregating the data by item.

Figure 24:
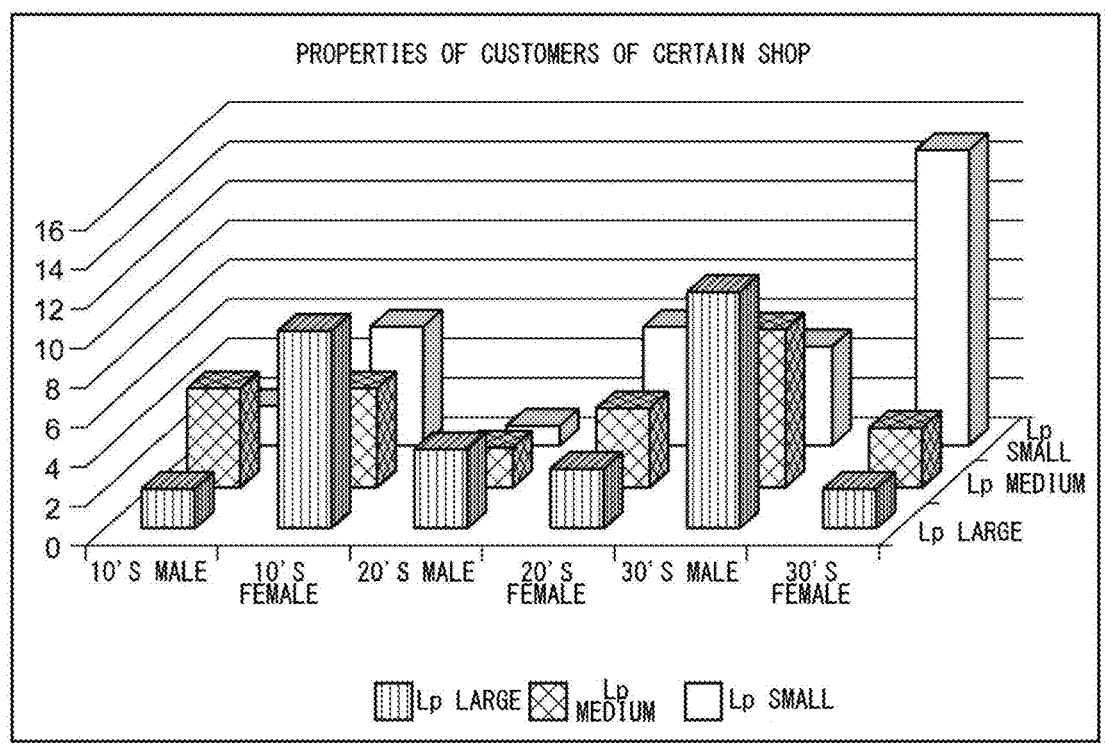
FIG. 24 is a diagram illustrating another information displayed on the management client according to the second embodiment.

FIG. 24 illustrates another information displayed on the management client 18 according to the second embodiment, and this is an example of displaying the data illustrated in FIG. 23, as a graph. By displaying as a graph, it becomes easier to recognize the property of the shop more intuitively. Based on the graph, it can be seen that groups having high ratios of purchasers with high leader points are 10's female and 30's male. Because customers with high leader points are more highly likely to attract new customers, the effect of a promotion targeted for 10's female and 30's male is considered to be high. On the other hand, customers with low leader points have relatively-strong tendency of accepting opinions and proposals of others, and conforming to these. In particular, such customers are expected to be relatively susceptible to the words of celebrities. In the example illustrated in FIG. 24, among 30's females, the ratio of purchasers with low leader points is high. Thus, effective measures for increasing the sales of this shop are determined to be using a celebrity who is popular among 30's females, in advertisement, and causing the celebrity to transmit information of this shop.

FIG. 25 illustrates yet another information displayed on the management client 18 according to the second embodiment, and this is an example of displaying a result obtained by classifying customers of a nationally-known certain shop located in Kanto area, by resident area, and further aggregating the numbers of customers by leader point category, in a tabular form. Such data is also derived by the aggregation processor 26 combining the user attribute table and the point history table 44 using terminal IDs as keys, and aggregating the data by item.

Figure 26:
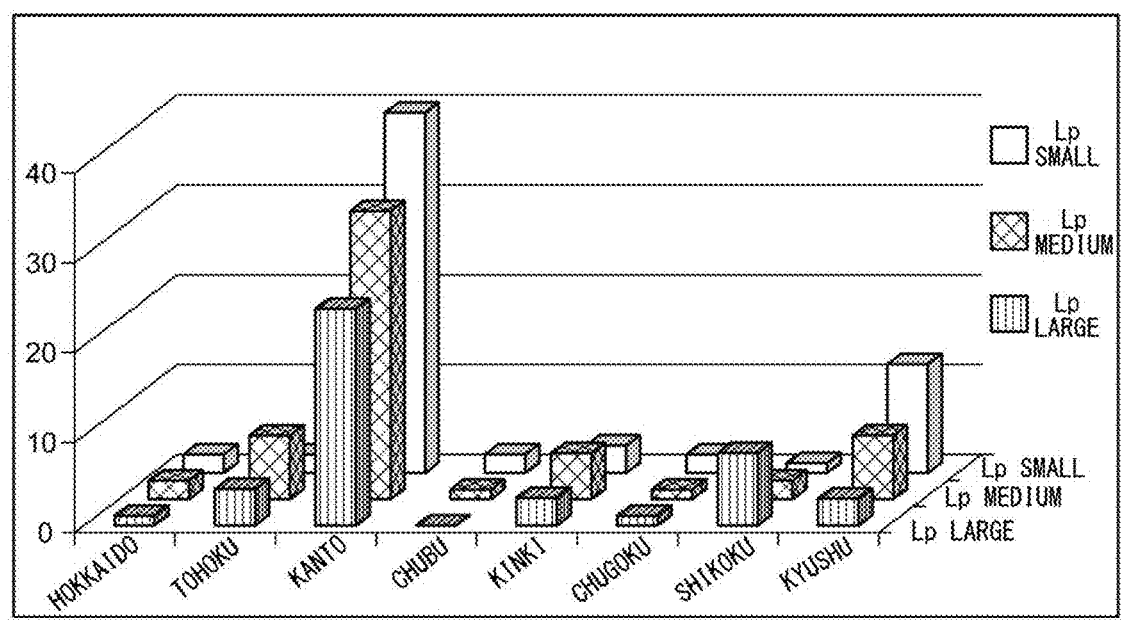
FIG. 26 is a diagram illustrating yet another information displayed on the management client according to the second embodiment.

FIG. 26 illustrates yet another information displayed on the management client 18 according to the second embodiment, and this is an example of displaying the same data as that illustrated in FIG. 25, as a graph. It is important for facilities such shopping malls to attract not only neighborhood residents but also customers from long distances. Nevertheless, it is costly to nationally take out an advertisement. It can be therefore determined that the number of customers from long distances is relatively smaller than the number of customers from neighboring areas, but customers from Shikoku, for example, have a large ratio of customers with high leader points, so the most effective way for increasing the number of customers from long distances is to perform promotion targeted for Shikoku.

According to the present embodiment, a leader point is calculated also according to attribute information of a user corresponding to a subject. Thus, the estimation accuracy of the power of influence of a user in a group can be enhanced. In addition, a leader point is calculated based on a plurality of items included in attribute information of a user. The estimation accuracy can be therefore enhanced. In addition, a leader point is calculated according to a relation between a date at which processing is executed, and attribute information of a user. Thus, the power of influence can be estimated in consideration of the date at which processing is executed. In addition, a leader point can be calculated with higher accuracy using attribute information of a user using a terminal device, in addition to location information of the terminal device. Thus, more effective information can be provided to a shop operator or an operating organization of a shopping mall. In addition, by using attribute information of a user, the power of influence of a member in a group that is related to shop selection or commercial product selection can be accurately converted into a numerical value as a leader point. In addition, aggregating can be performed while freely combining attribute information of a user and a leader point. Thus, the tendencies of customers and purchasers can be analyzed from a nonconventional viewpoint. Thus, the accuracy in the selection of the way and target of promotion can be enhanced.

Third Embodiment

Next, the third embodiment will be described. Similarly to those described so far, the third embodiment relates to an information provision system. Similarly to the second embodiment, an information provision apparatus 10 according to the third embodiment also forms a group using location information of a plurality of terminal devices 16, and estimates the power of influence of each user in the group. The third embodiment assumes a case in which a group is a family. An information provision system 100 and the information provision apparatus 10 according to the third embodiment are of similar types to those illustrated in FIGS. 1 and 20. A difference will now be mainly described.

First, in step S100, when a group is formed, group formation accuracy is enhanced by using user attribute information. In addition, the group former 40 changes a condition for forming a group, according to attribute information of a user corresponding to a subject. The attribute information of the user is stored in the user information storage 32.

FIG. 27 illustrates a data structure of another database stored in the user information storage 32 according to the third embodiment. As illustrated in FIG. 27, terminal IDs are added on a family basis. The description will return to FIG. 20. If terminal IDs are added on a family basis, the group former 40 eases a condition for determining these terminal devices 16 to be 1 group, as compared with a usual condition.

For example, if terminal devices 16 existing within a predetermined distance for a predetermined time or more are determined to be 1 group, the group former 40 sets a threshold value of a distance between terminals to a value longer than usual, or shortens the predetermined time. Such processing is premised on that a family is highly likely to act together toward a common destination. For example, in the course of the way toward the destination, even if a child temporarily goes away precedential to the others, determination indicating a group action is maintained, so that appropriate information can be provided.

Next, in step S110, using date of birth and relationship added in the database illustrated in FIG. 27, the point calculator 42 performs processing of setting a leader point that is based on location information of a child who is predetermined years old or younger (e.g., elementary student or younger), to be lower than that of a parent. For example, the point calculator 42 performs processing in such a manner that, even if the number of times a child is located at the front of the group is large, this is not reflected so much in a leader point that is based on location information. Specifically, the point calculator 42 performs control processing of, for example, multiplying the number of times the front location is observed, by 0.1, or providing an upper limit on the number of times of the front location that is to be used in the leader point calculation, with respect to a terminal device 16 of a child who is predetermined years old or younger. Young children often act impulsively and unexpectedly, but the execution of such control processing enables accurate calculation of a leader point that is based on location information.

In addition, because the power of influence of a mother is generally the strongest in a family, the point calculator 42 may perform processing of setting a leader point of the mother to be the largest. In addition, the point calculator 42 may perform calculation using association between a date (current time and date) at which processing is to be performed, and a relationship in a family. For example, if a current time and date at which a leader point is calculated is Jun. 21, 2015, and falls on the Father's Day, the point calculator 42 may calculate a leader point of a father to be higher than usual.

In addition, information about the type (role) of a member in a group may be stored in user attribute information, and the point calculator 42 may calculate a leader point using the stored information. For example, because a tour guide in a group tour is frequently located at the front of the group, member types such as "guide" and "customer" may be stored in user attribute information, and processing of reducing a leader point of the "guide," or excluding the "guide" from leader point calculation targets may be performed.

According to the present embodiment, a condition for forming a group is changed according to attribute information of a user corresponding to a subject. Thus, a group appropriate for the circumstances of a family or the like can be formed. In addition, because a leader point is calculated according to a family structure, the power of influence in a family can be estimated with high accuracy.

Fourth Embodiment

Next, the fourth embodiment will be described. Similarly to those described so far, the fourth embodiment relates to an information provision system. In the first embodiment, a category-based distribution (frequency) of leader points corresponding to each item, and a statistical value such as a representative value and a value indicating a dispersion degree of leader points corresponding to each item are calculated. On the other hand, in the fourth embodiment, a statistical value of leader points of each terminal device 16 (or each user) is calculated, and based on the calculated value, an item point corresponding to each item is calculated. An information provision system 100 and an information provision apparatus 10 according to the fourth embodiment are of similar types to those illustrated in FIGS. 1 and 20. A difference will now be mainly described.

The aggregation processor 26 in FIG. 20 scans the point history table 44 at a predetermined timing, and calculates the following indices, i.e., indices (statistical values) obtained by aggregating leader points, for each terminal ID. As the predetermined timing, a predetermined time interval such as once every day and once every hour may be used, or a timing at which new data is added in the point history table 44 may be used. In addition, processing may be performed on all data stored in the point history table 44, or may be performed only on data corresponding to a predetermined time period (the last 1 month, etc.).

(1) Representative Value of Leader Points

The aggregation processor 26 calculates a representative value of leader points of each terminal device 16. As a representative value, any of an average value, a median value, and a mode value can be used. In the following description, an average value is assumed to be used. For example, if 3 leader points of a certain terminal device 16 (Xth terminal device 16x) are recorded in the point history table 44, and the respective values are "0.6," "0.4," and "0.2," an average value is calculated to be "(0.6+0.4+0.2)/3=0.4." Alternatively, an average value may be calculated after leader points are corrected according to the number of people in a group. If normalization is performed in such a manner that the total sum of leader points in 1 group becomes "1," an average value (expected value) of leader points per person becomes smaller as the number of people in the group becomes larger. In addition, even if normalization is not performed, if the number of people in a group becomes larger, the frequency at which each member is located at the font of the group becomes lower. Thus, a leader point of each person tends to be smaller.

Thus, if the number of people in a group is large, correction processing of increasing the values of leader points is performed. For example, if the number of people in a certain group is larger than or equal to 5 and smaller than 8, leader points are multiplied by "1.25," if the number of people in the group is larger than or equal to 8 and smaller than 12, leader points are multiplied by "1.5," and if the number of people in the group is larger than or equal to 12, leader points are multiplied by "2.0." If the numbers of people in the group are "3," "6," and "12" when the respective leader points of the above-described Xth terminal device 16x are calculated, "(0.6+0.4×1.25+0.2×2.0)/3=0.5" becomes an average value (corrected average value).

(2) Value Indicating Dispersion Degree of Leader Points

The aggregation processor 26 calculates a value indicating a dispersion degree of leader points of the Xth terminal device 16x. For example, standard deviation, variance, (maximum value−minimum value), interquartile range (third quartile−first quartile), or the like can be used. In the following description, standard deviation is assumed to be used.

(3) Leader Point Category-Based Frequency

Similarly to step S310, the aggregation processor 26 associates leader points with leader point categories using a predetermined rule, and calculates the number of data (frequency) by category for each terminal device 16 (user). In addition, as described in step S310, a classification standard may be changed according to the number of people in the group.

(4) Leader Point Category-Based Relative Frequency

The aggregation processor 26 relativizes a leader point category-based frequency calculated in (3). Specifically, for each terminal device 16 (user), a relative frequency is calculated in such a manner that the total of frequencies becomes "1." For example, if category-based frequencies of the Xth terminal device 16x are "Lp large=8," "Lp medium=12," and "Lp small=5," the respective relative frequencies become "Lp large=8/(8+12+5)=0.32," "Lp medium=12/(8+12+5)=0.48," and "Lp small=5/(8+12+5)=0.2."

In addition, the aggregation processor 26 may calculate the above-described indices (1) to (4) for each combination of a terminal device 16 and shop genre. Such calculation can be performed by combining the shop information table and the point history table 44 using shop IDs as keys. For example, as for a certain terminal device 16 (the Xth terminal device 16x), indices such as "an Lp representative value of (the Xth terminal device 16x, Japanese food)=0.2," "an Lp representative value of (the Xth terminal device 16x, Western food)=0.5," and "an Lp representative value of (the Xth terminal device 16x, Chinese food=0.3" may be calculated. The same applies to an index indicating a dispersion degree of leader points described in (2).

In addition, as a category-based relative frequency described in (4), the aggregation processor 26 is only required to calculate a relative frequency in such a manner that the total sum of frequencies becomes "1," for each combination of a terminal device 16 and shop genre. For example, calculation can be performed in such a manner that "a relative frequency of Lp large of (the Xth terminal device 16x, Japanese food)=0.1," "a relative frequency of Lp medium of (the Xth terminal device 16x, Japanese food)=0.4," "a relative frequency of Lp small of (the Xth terminal device 16x, Japanese food)=0.5," "a relative frequency of Lp large of (the Xth terminal device 16x, Western food)=0.4," "a relative frequency of Lp medium of (the Xth terminal device 16x, Western food)=0.4," and "a relative frequency of Lp small of (the Xth terminal device 16x, Western food)=0.2."

The aggregation processor 26 calculates each index using the above-described method, and stores the obtained result in a user-based point aggregate table 46 in the aggregation processor 26. FIG. 28 illustrates a data structure of the user-based point aggregate table 46 according to the fourth embodiment. As illustrated in FIG. 28, terminal IDs (user IDs) and the above-described indices (1) to (4) are stored in association with each other. FIG. 29 illustrates a data structure of another user-based point aggregate table 46 according to the fourth embodiment. FIG. 29 illustrates an example of calculating and storing the indices, for each combination of a terminal device 16 and shop genre.

Furthermore, based on POS data and the like of each shop, the aggregation processor 26 creates and stores a purchase history table 48 as illustrated in FIG. 30. FIG. 30 illustrates a data structure of the purchase history table 48 according to the fourth embodiment. As illustrated in FIG. 30, shop IDs, terminal IDs (user IDs), commercial product IDs, quantities, and purchase times and dates are stored in association with each other. Terminal IDs (user IDs) may be derived from terminal devices 16 using Near Field Communication, in a cash register in a shop, or may be linked with point cards of customers in advance, and derived. Based on the purchase history table 48, a shop operator can recognize who has purchased an item, when an item has been purchased, where an item has been purchased, what has been purchased, and how many items have been purchased.

In this manner, by calculating a statistical value (e.g., average value, etc.) of leader points of each terminal ID that has been calculated by the point calculator 42, the aggregation processor 26 calculates an item point corresponding to each item. Furthermore, based on the user-based point aggregate table 46 and the purchase history table 48, the aggregation processor 26 creates display data for displaying on the management client 18. Then, the controller 30 transmits the display data to the management client 18 via the transceiver 20.

If the display data is received from the information provision apparatus 10, based on the received display data, the management client 18 displays information related to the leader points, on the display unit. FIG. 31 illustrates information displayed on the management client 18 according to the fourth embodiment, and this is an example of a display of leader point information. This is a table indicating an average value of leader points (Lp average value) and standard deviation of leader points (Lp standard deviation) by shop. This data can be created by combining the user-based point aggregate table 46 and the purchase history table 48 using terminal IDs as keys. For example, in the example of the purchase history table 48 illustrated in FIG. 30, 2 terminal devices with terminal IDs "A" and "B" are using a shop "S3," and as the example illustrated FIG. 28, if the Lp average values of the terminal IDs "A" and "B" are "0.2" and "0.5," respectively, an average value of these values "(0.2+0.5)/2=0.35" can be calculated as an item point of the shop "S3." In other words, based on an average value of leader points of each terminal device 16, an item point corresponding to each item can be calculated. In addition, if a single terminal device 16 uses a single shop a plurality of times, an average value may be calculated considering the number of usage times, or the average value may be calculated without considering the number. For example, a weighted average may be calculated in such a manner that a terminal device 16 with a larger number of usage times has a larger weight coefficient. Alternatively, an average value may be calculated by setting a weight coefficient to "1" for all terminal devices 16 irrespective of the number of usage times. In addition, an average value may be calculated considering the quantity of purchased commercial products. Next, using the average value calculated in this manner, standard deviation of leader points is calculated for each shop. For example, in the above-described example, if standard deviation of the shop "S3" is calculated, "SQRT (((0.2−0.35)^2+(0.5−0.35)^2)/2)=0.15" is obtained. In this equation, "SQRT" denotes square root and "^2" denotes square. In addition, in the case of performing processing in a simplified manner, processing of calculating an average value of standard deviations of each terminal device 16 and treating the calculated value as an approximate value of standard deviation of leader points may be performed.

Figure 32:
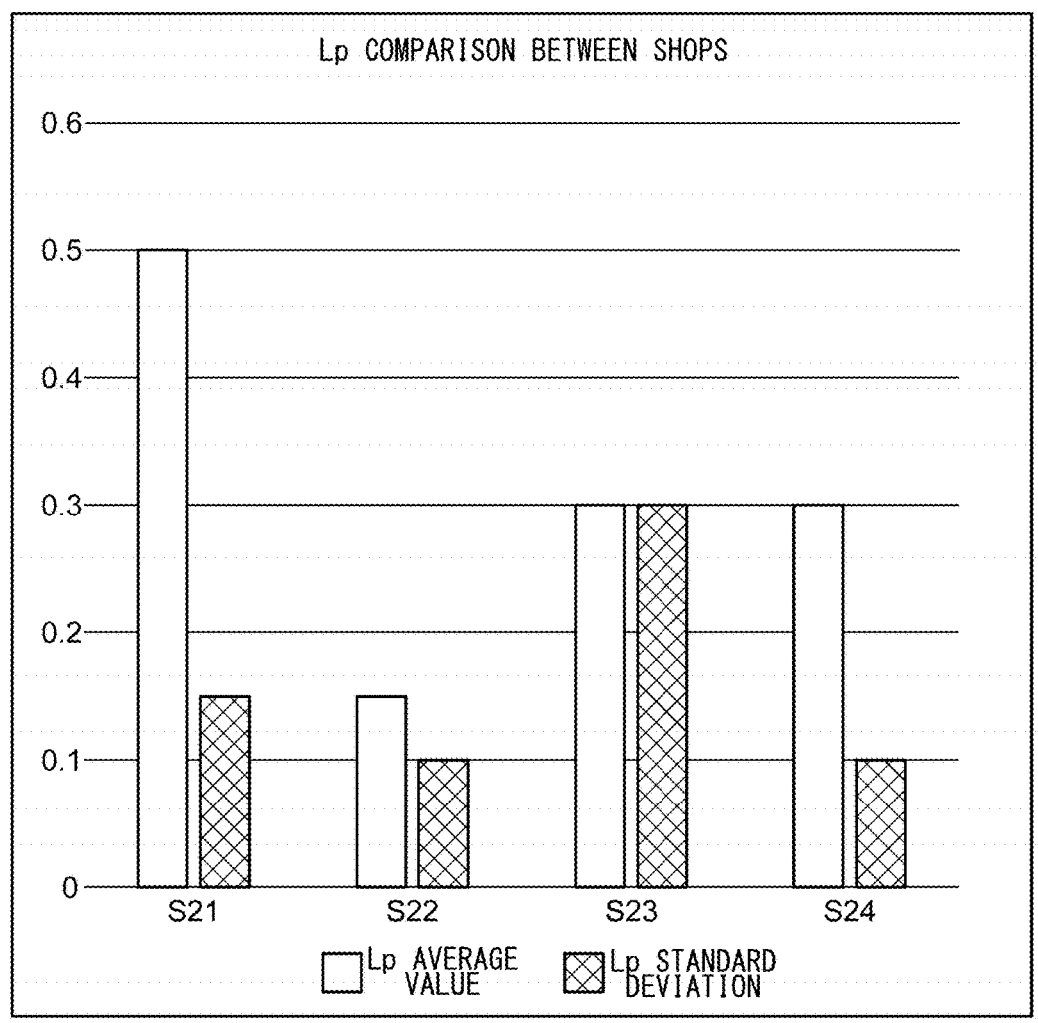
FIG. 32 is a diagram illustrating another information displayed on the management client according to the fourth embodiment.

It can be seen that an average value of leader points of customers that have visited a shop S21 (customers that have purchased commercial products) is higher than that of a shop S22. In addition, when shops S23 and S24 are compared, it can be seen that Lp average values are the same, but Lp standard deviation of the shop S23 is larger. Based on this data, it can be seen that variance of leader points of the customers of the shop S24 is smaller than that of the customers of the shop S23. In other words, as compared with the customers of the shop S23, the leader points of the customers of the shop S24 do not change so much on a moment-to-moment basis, and can be said to be stable. FIG. 32 illustrates another information displayed on the management client 18 according to the fourth embodiment, and this is an example of displaying the data illustrated in FIG. 31, in graph form. By such a graph display, a shop operator can intuitively recognize a difference in property between shops.

Figure 34:
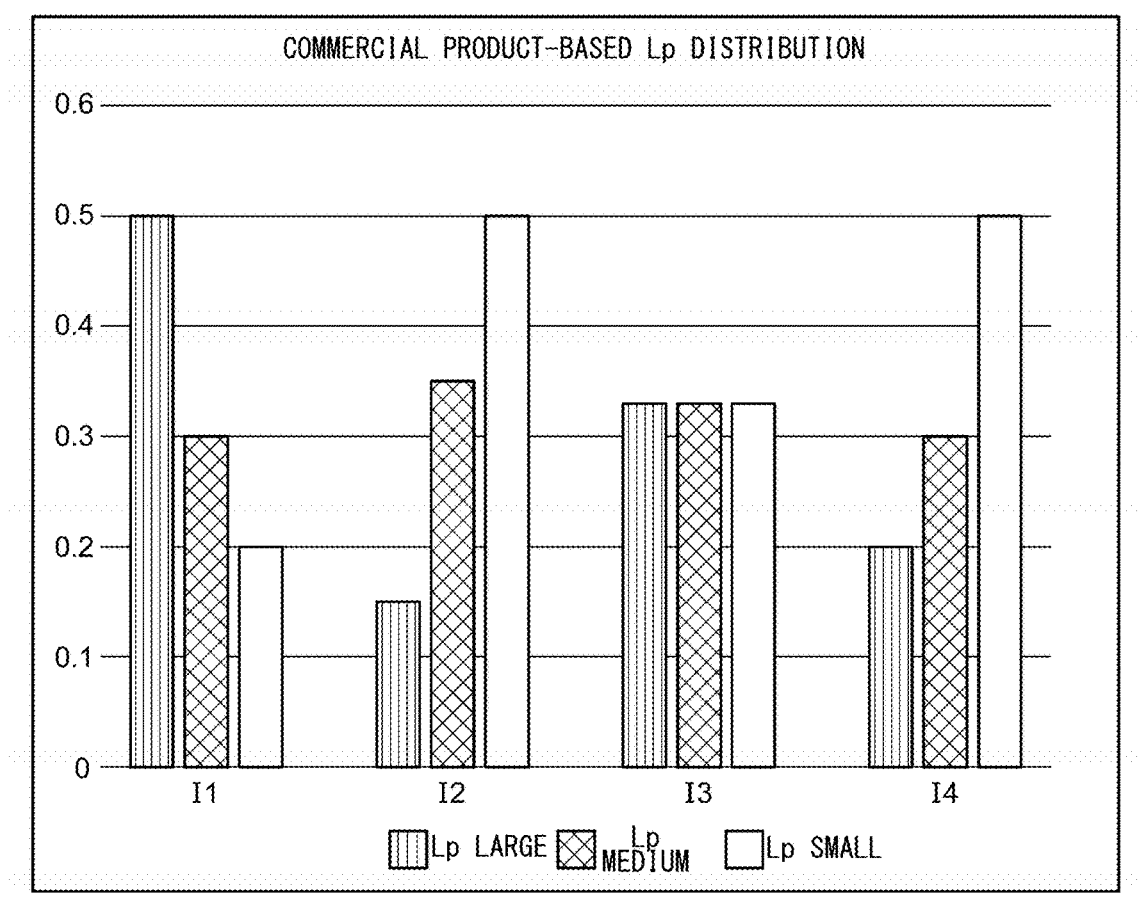
FIG. 34 is a diagram illustrating yet another information displayed on the management client according to the fourth embodiment.

FIG. 33 illustrates yet another information displayed on the management client 18 according to the fourth embodiment, and this is an example of displaying a distribution of leader point categories, by commercial product, in a tabular form. FIG. 34 illustrates yet another information displayed on the management client 18 according to the fourth embodiment, and this is an example of displaying the same data as that illustrated in FIG. 33, as a graph. This data is derived by combining the user-based point aggregate table 46 and the purchase history table 48 using terminal IDs as keys, and aggregating category-based frequencies or category-based relative frequencies in the user-based point aggregate table 46 by commercial product ID. Specifically, frequencies (or relative frequencies) are summed up for each category of "Lp large," "Lp medium," and "Lp small," and furthermore, frequencies are relativized in such a manner that the total sum of frequencies of each commercial product becomes "1." In other words, by further aggregating, by item, values obtained by aggregating leader points for each combination of a terminal ID (user ID) and a predetermined category that are recorded in the user-based point aggregate table 46, an item point can be calculated.

For example, it is assumed that there are 3 customers C, D, and E that have purchased a commercial product I2, and their category-based frequencies are "Lp large of C=10," "Lp large of D=20," "Lp large of E=5," "Lp medium of C=20," "Lp medium of D=10," "Lp medium of E=20," "Lp small of C=5," "Lp small of D=0," and "Lp small of E=10."

In this case, "the total of Lp large=10+20+5=35," "the total of Lp medium=20+10+20=50," and "the total of Lp small=5+0+10=15." Then, if these values are relativized, "relativized value of Lp large=35/100=0.35," "relativized value of Lp medium=50/100=0.5," and "relativized value of Lp small=15/100=0.15." Similar processing can be performed for other commercial products. In addition, when the data in the purchase history table 48 are aggregated, the data may be aggregated for each shop, or may be aggregated across a plurality of shops. In other words, the data may be aggregated for each combination of a commercial product ID and a shop ID, or may be aggregated for each commercial product ID irrespective of shop ID. Alternatively, as another method, the number of terminal devices 16 (or the number of users) may be counted and used as a category-based frequency. Specifically, this method can be performed by identifying 1 category with the largest frequency for each terminal device 16, and aggregating category-based frequencies for each item while assuming the frequency of the identified category to be "1" and frequencies of the other categories to be "0." For example, in the above-described numerical example, as for the customer C, the frequency of "Lp medium" is the largest. Thus, "Lp medium of C=1," and other categories are set to "0." As for the customer D, "Lp large of D=1," and other categories are set to "0." As for the customer E, "Lp medium of E=1," and other categories are set to "0." As a result, category-based frequencies of leader points of the commercial product I2 are "Lp large=1," "Lp medium=2," and "Lp small=0."

By viewing FIG. 33, for example, a shop operator can determine that "because the ratio of Lp large of the commercial product I1 is large, the demand is expected to increase in the future," "because the commercial product I2 and a commercial product I4 have similar tendencies in distribution, similar customer segments may purchase these products, and accordingly, disposing shelves of these 2 commercial products close to each other may increase the sales."

FIG. 35 illustrates yet another information displayed on the management client 18 according to the fourth embodiment, and this is an example of displaying shop genres, and shop genre-based Lp average values, by shop, in a tabular form. The shop genre of a shop S21 is "Japanese food," and the Lp average value of Japanese food is higher than those of Western food and Chinese food. It can be therefore said that the many of the customers of the shop S21 are of the type exercising strong power of influence in the selection of a Japanese food restaurant. For example, an operator of the shop S21 can determine that "pursuing Japanese food in reality-oriented manner without introducing menus of other food genres will lead to prosperity of the shop."The shop genre of a shop S22 is also "Japanese food," but the Lp average value of Western food is higher than the Lp average value of Japanese food. It can be therefore said that the many of the customers of the shop S22 are of the type exercising strong power of influence in the selection of a Western food restaurant. By performing such a display, an operator of the shop S22 can devise such a strategy that "executing collaborative campaign with a neighboring Western food restaurant may increase customers," for example. In addition, the shop genre of a shop S24 is "Chinese food," but the Lp average value of Japanese food is considerably high. Thus, an operator of the shop S24 can predict that "introducing Japanese food elements into menus is highly likely to increase sales," for example.

In addition, the present embodiment is not limited to real shops, and can be easily applied to Internet shopping sites and the like. In other words, the user-based point aggregate table 46 is created based on user actions targeted for real shops, but the purchase history table 48 is not limited to real shops, and may be created based on Internet shopping sites. In addition, real shops and Internet shopping sites may both be listed in the purchase history table 48. In this manner, using leader points calculated based on user actions related to real shops, information indicating the properties of Internet shopping sites and information (item point) indicating the properties of commercial products handled in the Internet shopping sites can be created. Thus, the present embodiment is applicable to a wide range of systems.

According to the present embodiment, the properties of customers can be reflected in provided information not only in a case in which customers visit a shop in a group, but also in a case in which customers independently visit the shop. In addition, the properties of customers can be easily presented not only by shop but also by commercial product. The information can be therefore applied to the purchase plan of commercial products, or the like.

Fifth Embodiment

Next, the fifth embodiment will be described. Similarly to those described so far, the fifth embodiment relates to an information provision system. In the embodiments described so far, leader points are calculated based on a characteristic action of a user in 1 group action. On the other hand, in the fifth embodiment, leader points calculated in a past group action are reflected in leader points in a current group action. Specifically, in leader points of a certain user (1 user) in a group, past leader points of the other users are reflected. An information provision system 100 and an information provision apparatus 10 according to the fifth embodiment are of similar types to those illustrated in FIGS. 1, and 2 or 20. A difference will now be mainly described.

In the present embodiment, after executing step S110, the information provision apparatus 10 executes step S115 (not illustrated) before executing step S120. FIG. 36 illustrates a data structure of a database stored in the group information processor 24 according to the fifth embodiment. In the following description, it is assumed that a group ID of a processing target group (current group) is "G21," and in the group information table, 3 terminal devices 16 "C," "D," and "E" correspond to "G21." These 3 terminal devices 16 correspond to the third terminal device 16c, the fourth terminal device 16d, and the fifth terminal device 16e. Furthermore, leader points at a certain time point (temporary points) are assumed to be "C=80," "D=100," and "E=60."

In addition, data illustrated in FIG. 37 is assumed to be stored in the point history table 44. FIG. 37 illustrates a data structure of the point history table 44 according to the fifth embodiment. As described above, the point history table 44 is a table indicating past leader points of each terminal ID, and is, for example, a table indicating calculation times and dates, and leader points in association with each other.

Figure 38:
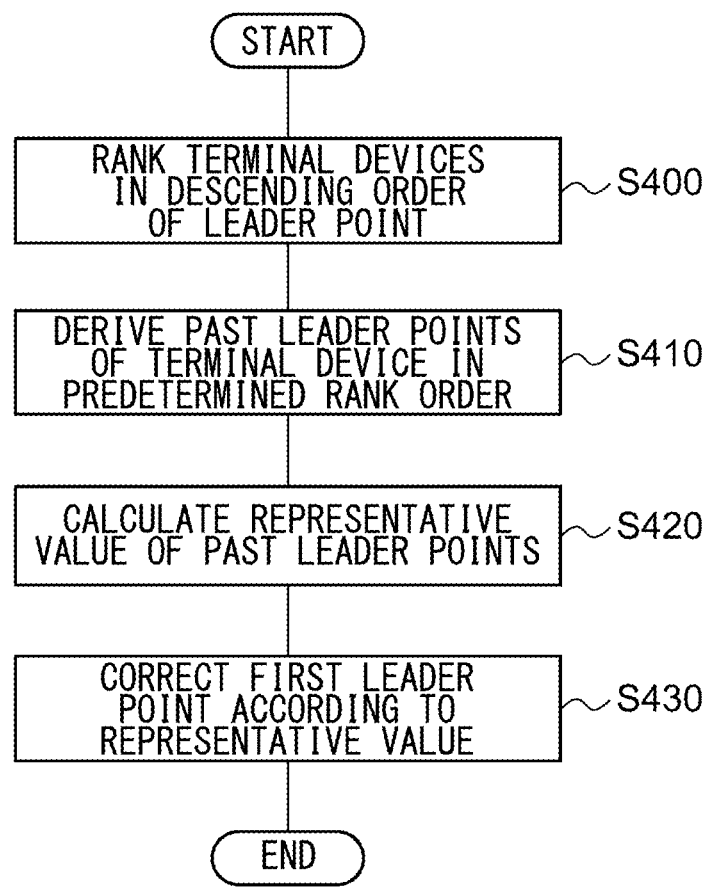
FIG. 38 is a flowchart illustrating a leader point correction procedure performed by an information provision apparatus according to the fifth embodiment.

FIG. 38 is a flowchart illustrating a leader point correction procedure performed by the information provision apparatus 10 according to the fifth embodiment, and is a flowchart illustrating details of step S115. First, in step S400, the point calculator 42 ranks terminal devices 16 in a target processing group in the descending order of leader points (temporary points). In the above-described example, "D=first," "C=second," and "E=third."

Next, in step S410, the point calculator 42 derives past leader points of terminal devices 16 in predetermined rank orders. In this example, the predetermined rank orders refer to rank orders from the second to a certain rank order (Xth) subsequent to the second. More specifically, the point calculator 42 first derives past leader points of the second terminal device 16 by referring to the point history table 44 stored in the aggregation processor 26. In the above-described example, past leader points of the third terminal device 16c are derived. In the example illustrated in FIG. 37, the point calculator 42 derives 3 data of "(G11, C)=0.4," "(G12, C)=0.6," and "(G13, C)=0.8." The predetermined rank order may be set to the second only by setting X=second. If the predetermined rank orders are set to "the second and the third" by setting X=3, the point calculator 42 further derives past leader points of the fifth terminal device 16e.

In the example illustrated in FIG. 37, there are 2 data of "(G11, E)=0.05" and "(G12, E)=0.15." In addition, the point calculator 42 may derive past leader points while limiting a group ID to the one not including the first terminal device 16. For example, when deriving past leader points of the second terminal device 16, the point calculator 42 derives the past leader points while excluding a group ID including the fourth terminal device 16d. In the above-described example, because the fourth terminal device 16d is included in a group ID G11, the point calculator 42 may exclude the group ID G11, and derive 2 data of "(G12, C)=0.6" and "(G13, C)=0.8." As for the third terminal device 16, the point calculator 42 similarly derives past leader points not including the first terminal device 16. In this manner, by deriving past leader points while limiting data to those not including the first terminal device 16, leader point correction accuracy to be described later may be enhanced in some cases.

Next, in step S420, the point calculator 42 calculates a representative value of past leader points for each terminal device 16, using derived leader points. As a representative value, any of an average value, a median value, and a mode value can be used. In the following description, an average value is assumed to be used. In the above-described example, an average value of the third terminal device 16c is calculated to be "(0.4+0.6+0.8)/3=0.6." An average value of the fifth terminal device 16e is calculated to be "(0.05+0.15)/2=0.1."

Next, in step S430, the point calculator 42 determines whether a calculated representative value satisfies a predetermined condition, and according to the determination result, corrects the first leader point. More specifically, the point calculator 42 sets a representative value being larger than or equal to a predetermined value θ1, as the predetermined condition, and increments the first leader point if the representative value satisfies the condition. For example, if "θ1=0.3" is set, in the above-described example, the third terminal device 16c satisfies this condition. Thus, the first leader point "D=100" is multiplied by 1.5 to set "D=150," or "30" is added thereto to set "D=130." In other words, the point calculator 42 corrects the leader point by multiplying the first leader point by a predetermined coefficient, or by adding a predetermined value thereto. If there are terminal devices 16 (users) with high past leader points among the second and subsequent terminal devices 16 (users), the power of influence of the first terminal device 16 (user) with a leader point further higher than those can be estimated to be very strong. In other words, a user with a leader point further higher than those of users whose leader points had been high in the past can be estimated to be a user having very strong power of influence. Thus, the point calculator 42 performs processing of making leader points higher than usual.

In addition, the point calculator 42 may set a representative value being smaller than a predetermined value θ2, as the predetermined condition, and perform processing of reducing the first leader point, if the representative value satisfies the condition. For example, if "θ2=0.2" is set, in the above-described example, the fifth terminal device 16e satisfies this condition. Thus, the first leader point "D=100" is multiplied by 0.8 to set "D=80," or "10" is subtracted therefrom to set "D=90." If there are terminal devices 16 (users) with low past leader points among the second and subsequent terminal devices 16 (users), the power of influence of the first terminal device 16 (user) in a current group can be estimated to appear stronger than actual power because the power of influence of other users is weak. Thus, the point calculator 42 performs processing of making leader points lower than usual.

In addition, the point calculator 42 may change the degree of increasing or decreasing leader points, according to the number of terminal devices 16 having a representative value larger than or equal to the predetermined value θ1. For example, the point calculator 42 may perform processing of multiplying a leader point by "1.5" if the number of terminal devices 16 having a representative value larger than or equal to the predetermined value θ1 is 1, by "2" if the number is 2, and by "3" if the number is larger than or equal to 3. In addition, the point calculator 42 may multiply a leader point by "2" if a representative value of the second terminal device 16 is larger than or equal to the predetermined value θ1, by "1.5" if a representative value of the third terminal device 16 is larger than or equal to the predetermined value θ1, and by "2×1.5=3" if the representative values of the second and third terminal devices 16 are both larger than or equal to the predetermined value el. In other words, the point calculator 42 may change the degree of leader point correction according to the rank order of a terminal device 16 of which a representative value satisfies a predetermined condition.

In addition, in the above description, a leader point of the first terminal device 16 is corrected. Alternatively, leader points of the second and subsequent terminal devices 16 may be corrected in a similar manner, if the number of terminal devices 16 included in a group is large. For example, using past leader points of the third terminal device 16, a leader point of the second terminal device 16 may be increased or decreased. In other words, the point calculator 42 calculates a leader point of 1 subject included in a group, based on leader points calculated in the past that correspond to another subject included in the group.

According to the present embodiment, a leader point of 1 subject included in a group is calculated based on leader points calculated in the past that correspond to another subject included in the group. The calculation accuracy can be therefore enhanced. In addition, a leader point of a processing target group is corrected using past leader points accumulated in a point history table. Thus, the power of influence of a user can be reflected in a leader point more accurately.

The present invention has been described above based on the embodiments. These embodiments are examples, and the one skilled in the art understands that various modifications can be made on combinations of constituent elements and processing processes of these, and such modifications are included in the scope of the present invention.

The first to fifth embodiments may be defined by items described below.

[Item 1]

An information provision apparatus comprising:

a group former that derives location information of a subject being a user or a terminal device, and forms a group including a plurality of subjects, based on time-series data of location information related to a plurality of subjects;

a point calculator that calculates a feature action amount indicating a matching degree to a predetermined action pattern, based on which power of influence of a subject in a group is determined to be high, based on time-series data of the location information, for each of the plurality of subjects included in the group formed by the group former, and calculates a point of each subject based on the feature action amount;

an aggregation processor that calculates an item point corresponding to each item, by aggregating points calculated by the point calculator; and an outputter that outputs an item point calculated by the aggregation processor.

[Item 2]

An information provision apparatus comprising:

a group former that derives location information of a subject being a user or a terminal device, and forms a group including a plurality of subjects, based on time-series data of location information related to a plurality of subjects;

a point calculator that calculates a feature action amount indicating a matching degree to a predetermined action pattern, based on which power of influence of a subject in a group is determined to be high, based on time-series data of the location information, for each of the plurality of subjects included in the group formed by the group former, and calculates a point of each subject based on the feature action amount; and an outputter that outputs a point calculated by the point calculator, in association with information related to an item.

[Item 3]

The information provision apparatus according to item 1, wherein the aggregation processor calculates an item point corresponding to each item, by aggregating points corresponding to each item, by category, using a predetermined category defined according to a magnitude of a point.

[Item 4]

The information provision apparatus according to item 1, wherein the aggregation processor calculates an item point corresponding to each item, using a statistical value of points calculated by the point calculator.

[Item 5]

The information provision apparatus according to item 1, wherein the aggregation processor calculates an item point corresponding to each item, using a statistical value obtained by aggregating points calculated by the point calculator, for each subject, or a value obtained by aggregating points calculated by the point calculator, for each combination of a subject and a predetermined category.

[Item 6]

The information provision apparatus according to any one of items 1 to 5, wherein the point calculator calculates, as the feature action amount, at least one of the number of times a movement pattern of a subject in time-series data of the location information matches the predetermined action pattern, a time in which the movement pattern matches the predetermined action pattern, a movement distance in which the movement pattern matches the predetermined action pattern, and a probability at which the movement pattern matches the predetermined action pattern, and calculates the point in such a manner as to be a higher value as the feature action amount becomes larger.

[Item 7]

The information provision apparatus according to any one of items 1 to 6, wherein the predetermined action pattern in the point calculator is a pattern in which a subject is located at a location in a predetermined rank order from a front of a group, with respect to a moving direction of the group.

[Item 8]

The information provision apparatus according to item 7, wherein the point calculator calculates a point in such a manner as to be higher as the predetermined rank order becomes higher.

[Item 9]

The information provision apparatus according to any one of items 1 to 8, wherein the predetermined action pattern in the point calculator is a pattern in which, in a case in which a group is divided into a plurality of groups, and then, the groups join together, a subject has been moving in a direction in which the group moves after the join, from a time of division.

[Item 10]

The information provision apparatus according to item 9, wherein the point calculator calculates a point based on the number of subjects included in a small group obtained when the group is divided into the plurality of groups.

[Item 11]

The information provision apparatus according to any one of items 1 to 10, wherein the predetermined action pattern in the point calculator is a pattern in which, in a case in which a subject stops, another subject also stops following the stop.

[Item 12]

The information provision apparatus according to item 11, wherein the point calculator calculates a point based on the number of other subjects that have stopped following the stop.

[Item 13]

The information provision apparatus according to any one of items 1 to 12, wherein the point calculator calculates a point according to attribute information of a user corresponding to a subject.

[Item 14]

The information provision apparatus according to any one of items 1 to 13, wherein the point calculator calculates a point according to a distance between a location of an item and a location of a subject.

[Item 15]

The Information provision apparatus according to any one of items 1 through 14, wherein the point calculator calculates a point of a subject included in the group, based on points calculated in the past for the other subjects included in the group.

[Item 16]

The information provision apparatus according to any one of items 1 to 14, wherein the group former changes a condition for forming a group, according to attribute information of a user corresponding to a subject.

[Item 17]

A management client that can communicate with the information provision apparatus according to item 1, the management client comprising:

a receiver that receives the item point from the information provision apparatus; and a controller that performs control to display the received data, on a display unit.

[Item 18]

A management client that can communicate with the information provision apparatus according to item 2, the management client comprising:

a receiver that receives the point and information related to an item, from the information provision apparatus; and a controller that performs control to display the received data, on a display unit.

[Item 19]

An information provision method comprising:

a step of deriving location information of a subject being a user or a terminal device, and forming a group including a plurality of subjects, based on time-series data of location information related to a plurality of subjects;

a step of calculating a feature action amount indicating a matching degree to a predetermined action pattern, based on which power of influence of a subject in a group is determined to be high, based on time-series data of the location information, for each of the plurality of subjects included in the formed group, and calculating a point of each subject based on the feature action amount;

a step of calculating an item point corresponding to each item, by aggregating calculated points; and a step of outputting a calculated item point.

[Item 20]

An information provision method comprising:

a step of deriving location information of a subject being a user or a terminal device, and forming a group including a plurality of subjects, based on time-series data of location information related to a plurality of subjects;

a step of calculating a feature action amount indicating a matching degree to a predetermined action pattern, based on which power of influence of a subject in a group is determined to be high, based on time-series data of the location information, for each of the plurality of subjects included in the formed group, and calculating a point of each subject based on the feature action amount; and a step of outputting a calculated point in association with information related to an item.

[Item 21]

A non-transitory computer-readable recording medium having embedded thereon a program, the program comprising:

a step of deriving location information of a subject being a user or a terminal device, and forming a group including a plurality of subjects, based on time-series data of location information related to a plurality of subjects;

a step of calculating a feature action amount indicating a matching degree to a predetermined action pattern, based on which power of influence of a subject in a group is determined to be high, based on time-series data of the location information, for each of the plurality of subjects included in the formed group, and calculating a point of each subject based on the feature action amount;

a step of calculating an item point corresponding to each item, by aggregating calculated points; and a step of outputting a calculated item point.

[Item 22]

A non-transitory computer-readable recording medium having embedded thereon a program, the program comprising:

a step of deriving location information of a subject being a user or a terminal device, and forming a group including a plurality of subjects, based on time-series data of location information related to a plurality of subjects;

a step of calculating a feature action amount indicating a matching degree to a predetermined action pattern, based on which power of influence of a subject in a group is determined to be high, based on time-series data of the location information, for each of the plurality of subjects included in the formed group, and calculating a point of each subject based on the feature action amount; and a step of outputting a calculated point in association with information related to an item.

What is claimed is:

1. An information provision apparatus using a computer including at least one of: a central processing unit (CPU), a random access memory (RAM), a read-only memory (ROM), a hard disk drive (HDD), or a network interface, and can be implemented as a computer program executed therein, comprising:

a group former that derives location information of a subject being a user or a terminal device, calculates a distance between a plurality of subjects based on time-series data of location information related to the plurality of subjects, and forms a group including the plurality of subjects as members when the plurality of subjects exist within a predetermined distance for a predetermined time or more;

a point calculator that determines, in a period elapsed since the group is formed until an item is selected by the group, whether a relationship between a temporal change in a location of an arbitrary given member belonging to the group and a temporal change in a location of another member matches any of a plurality of kinds of change pattern related to the location information based on the time-series data of the location information, and when it is determined that there is a match, calculates a point for each member in the group by adding a first value to the point of the given member;

an aggregation processor that refers to points calculated by the point calculator as corresponding to a given item, aggregates the number of points having a first predetermined threshold value or larger, and creates item point information including a result of aggregation; and an outputter that outputs the item point information created by the aggregation processor;

wherein the aggregation processor further calculates a statistical value that is at least one of a representative value of the points calculated by the point calculator and a value indicating a dispersion degree of the points and includes the statistical value in the item point information.

2. The information provision apparatus according to claim 1, wherein one of the plurality of kinds of change pattern in the point calculator related to the location information is a pattern in which, in a case the group is divided into a plurality of subgroups and then the groups joint together, the given member has moved, since a time of division, in a direction in which the group moves after the join, and the larger the frequency of joins, the larger the value of the point of the given member.

3. The information provision apparatus according to claim 1, wherein the point calculator calculates the point of the given member by using a value to which the first value is added and a second value determined by user attribute information corresponding to the given member.

4. The information provision apparatus according to claim 1, wherein, when the group selects an item, the point calculator further increases the point of the given member when the point of the given member is increased in an area within a predetermined distance from a position of the item.

5. The Information provision apparatus according to claim 1, wherein the point calculator calculates the point of the given member based on the point calculated when another member included in the group belonged to another group in the past.

6. The information provision apparatus according to claim 1, wherein:
the item selected by the group is a shop, and
when the location information on the members in the group remain unchanged for a predetermined period of time or longer, the point calculator determines that the group has selected an item and does not update the point subsequently.

7. The information provision apparatus according to claim 2, wherein
of the plurality of subgroups, the larger the number of members in a joining subgroup that does not include the given member, the larger the first value that the point calculator defines.

8. The information provision apparatus according to claim 2, wherein
of the plurality of subgroups, the smaller the number of members in a joined subgroup that includes the given member, the larger the first value that the point calculator defines.

9. An information provision apparatus using a computer including at least one of: a central processing unit (CPU), a random access memory (RAM), a read-only memory (ROM), a hard disk drive (HDD), or a network interface, and can be implemented as a computer program executed therein, comprising:
a group former that derives location information of a subject being a user or a terminal device, calculates a distance between a plurality of subjects based on time-series data of location information related to the plurality of subjects, and forms a group including the plurality of subjects as members when the plurality of subjects exist within a predetermined distance for a predetermined time or more;
a point calculator that determines, in a period elapsed since the group is formed until an item is selected by the group, whether a relationship between a temporal change in a location of an arbitrary given member belonging to the group and a temporal change in a location of another member matches any of a plurality of kinds of change pattern related to the location information based on the time-series data of the location information, and when it is determined that there is a match, calculates a point for each member in the group by adding a first value to the point of the given member;
an aggregation processor that refers to points calculated by the point calculator as corresponding to a given item, aggregates the number of points having a first predetermined threshold value or larger, and creates item point information including a result of aggregation; and
an outputter that outputs the item point information created by the aggregation processor;
wherein one of the plurality of kinds of change pattern in the point calculator related to the location information is a pattern in which a member located at a predetermined rank from a front of the group moves with respect to a moving direction of the group, and the more frequent the given member is at the predetermined rank from the start of the group, the larger the value of the point of the given member.

10. The information provision apparatus according to claim 9, wherein the aggregation processor creates the item point information by using three or more types of predetermined categories determined by a magnitude of the point and a second threshold value smaller than the first threshold value, aggregating the points corresponding to the given item category by category, by associating the point having a value equal to or larger than the first threshold value to a first category, associating the point having a value less than the first threshold value and equal to or larger than the second threshold value to a second category, and associating at least some of the points having a value less than the second threshold value to a third category.

11. The information provision apparatus according to claim 9, wherein
the closer the rank of the given member to the front of the group, the larger the first value that the point calculator defines.

12. The information provision apparatus according to claim 9, wherein
the smaller the number of members in the group, the closer to the front of the group that the point calculator limits the predetermined rank.

13. The information provision apparatus according to claim 10, wherein
the aggregation processor changes threshold values that define a classification standard of the three or more types of categories, depending on the number of members in the group.

14. An information provision apparatus using a computer including at least one of: a central processing unit (CPU), a random access memory (RAM), a read-only memory (ROM), a hard disk drive (HDD), or a network interface, and can be implemented as a computer program executed therein, comprising:
a group former that derives location information of a subject being a user or a terminal device, calculates a distance between a plurality of subjects based on time-series data of location information related to the plurality of subjects, and forms a group including the plurality of subjects as members when the plurality of subjects exist within a predetermined distance for a predetermined time or more;
a point calculator that determines, in a period elapsed since the group is formed until an item is selected by the group, whether a relationship between a temporal change in a location of an arbitrary given member belonging to the group and a temporal change in a location of another member matches any of a plurality of kinds of change pattern related to the location information based on the time-series data of the location information, and when it is determined that there is a match, calculates a point for each member in the group by adding a first value to the point of the given member;
an aggregation processor that refers to points calculated by the point calculator as corresponding to a given item, aggregates the number of points having a first predetermined threshold value or larger, and creates item point information including a result of aggregation; and
an outputter that outputs the item point information created by the aggregation processor;
wherein one of the plurality of kinds of change pattern in the point calculator related to the location information is a pattern in which, when the given member stops, another member also stops following the stop, and the more frequent the given member stops, the larger the value of the point of the given member.

15. The information provision apparatus according to claim 14, wherein the larger the number of members that stop following the stop of the given member, or, of all members in the group, the larger the proportion of members that stop, the larger the first value that the point calculator defines.

* * * * *